US010144495B2

(12) United States Patent
Ebihara

(10) Patent No.: US 10,144,495 B2
(45) Date of Patent: Dec. 4, 2018

(54) OUTBOARD MOTOR

(71) Applicant: Kanzaki Kokyukoki Mfg. Co., Ltd., Amagasaki-shi, Hyogo (JP)

(72) Inventor: Tomoyuki Ebihara, Amagasaki (JP)

(73) Assignee: KANZAKI KOKYUKOKI MANUFACTURING CO., LTD., Hyogo (JP)

( * ) Notice: Subject to any disclaimer, the term of this patent is extended or adjusted under 35 U.S.C. 154(b) by 0 days.

(21) Appl. No.: 15/684,424

(22) Filed: Aug. 23, 2017

(65) Prior Publication Data
US 2018/0057134 A1    Mar. 1, 2018

(30) Foreign Application Priority Data

Aug. 24, 2016 (JP) ................. 2016-164182
Aug. 24, 2016 (JP) ................. 2016-164183
Aug. 24, 2016 (JP) ................. 2016-164184

(51) Int. Cl.
| | |
|---|---|
| B63H 23/02 | (2006.01) |
| F16H 3/08 | (2006.01) |
| B63H 20/00 | (2006.01) |
| F16H 3/085 | (2006.01) |
| F16H 3/091 | (2006.01) |
| F16H 3/10 | (2006.01) |
| B63H 23/30 | (2006.01) |
| B63H 20/20 | (2006.01) |
| B63H 23/08 | (2006.01) |

(Continued)

(52) U.S. Cl.
CPC ............ *B63H 23/02* (2013.01); *B63H 20/20* (2013.01); *B63H 23/08* (2013.01); *B63H 23/30* (2013.01); *B63H 23/34* (2013.01); *F16H 3/085* (2013.01); *F16H 3/091* (2013.01); *F16H 3/10* (2013.01); *F16H 3/78* (2013.01); *F16H 2003/0822* (2013.01)

(58) Field of Classification Search
CPC ...... B63H 20/00; B63H 20/002; B63H 20/14; F16H 3/08; F16H 3/087; F16H 3/02; F16H 3/09; F16H 3/093; F16H 3/12
USPC ................. 440/75; 74/329, 330, 335, 339
See application file for complete search history.

(56) References Cited

U.S. PATENT DOCUMENTS 9,238,503 B2 * 1/2016 Kubo .............. B63H 20/002

FOREIGN PATENT DOCUMENTS

| JP | 2009185972 A | 8/2009 |
| JP | 2011110968 A | 6/2011 |
| WO | 2007007707 A1 | 1/2007 |

\* cited by examiner

*Primary Examiner* — Lars A Olson
(74) *Attorney, Agent, or Firm* — Cantor Colburn LLP

(57) ABSTRACT

An outboard motor includes an engine having an output portion. A lower gear mechanism drives a propeller disposed below the engine. A transmission includes an input shaft that transmits power from the output portion to the transmission. An output shaft transmits power from the transmission to the lower gear mechanism. A reverse idler shaft is parallel to an intermediate shaft. A forward clutch is disposed on one of the input and intermediate shafts and connects and disconnects power from the input shaft to the intermediate shaft. A reverse clutch is disposed on the intermediate shaft and connects and disconnects power transmission from the input shaft to the intermediate shaft. Power of the input shaft is transmitted to the output shaft via the forward clutch and the intermediate shaft and is transmitted to the output shaft via the reverse idler shaft, the reverse clutch, and the intermediate shaft.

16 Claims, 19 Drawing Sheets

(51) Int. Cl.
*B63H 23/34* (2006.01)
*F16H 3/78* (2006.01)

OUTBOARD MOTOR

CROSS-REFERENCE TO RELATED APPLICATIONS

The present application claims priority under 35 U.S.C. § 119 to Japanese Patent Application Nos. JP2016-164182, JP2016-164183, and JP2016-164184, all filed on Aug. 24, 2016, the entire content of which are incorporated herein by reference.

BACKGROUND OF THE INVENTION

Field of the Invention

The present invention relates to outboard motors that include a transmission located between an engine and a lower gear mechanism for driving a propeller.

Discussion of the Background

Conventionally known outboard motors include a transmission located between an engine and a lower gear mechanism for driving a propeller (see, for example, Japanese Unexamined Patent Application Publication No. 2011-110968, WO 2007/7707, and Japanese Unexamined Patent Application Publication No. 2009-185972).

However, in the outboard motor disclosed in Japanese Unexamined Patent Application Publication No. 2011-110968, a forward/reverse switching mechanism that is capable of switching the rotational output of the propeller between forward rotation and reverse rotation is provided in the lower gear mechanism separately from the transmission. This undesirably increases the size of the outboard motor. In the outboard motors disclosed in WO 2007/007707 and Japanese Unexamined Patent Application Publication No. 2009-185972, although the forward/reverse switching mechanism is provided in the transmission, a forward/reverse switching mechanism that utilizes a planet gear mechanism is employed. Thus, the structure is complicated, and the size of the transmission is undesirably increased. Additionally, the costs are undesirably increased.

SUMMARY OF THE INVENTION

It is a technical object of the present invention to provide an outboard motor that has been improved upon consideration of the above-mentioned current state.

According to one aspect of the present invention, an outboard motor includes an engine, a lower gear mechanism, and a transmission. The engine includes an output portion extending along an approximately vertical axis. The lower gear mechanism is configured to drive a propeller disposed below the engine. The transmission is between the engine and the lower gear mechanism. The transmission includes an input shaft, an output shaft, an intermediate shaft, a reverse idler shaft, a forward clutch, and a reverse clutch. The input shaft is configured to transmit power from the output portion of the engine to the transmission. The output shaft is configured to transmit power from the transmission to the lower gear mechanism. The input shaft and the output shaft extend along an approximately vertical axis. The reverse idler shaft is disposed parallel to the intermediate shaft along an approximately vertical axis. The forward clutch is disposed on at least one of the input shaft and the intermediate shaft and is configured to connect and disconnect power from the input shaft to the intermediate shaft. The reverse clutch is disposed on the intermediate shaft and is configured to connect and disconnect power transmission from the input shaft to the intermediate shaft via the reverse idler shaft. Power of the input shaft is transmitted to the output shaft via the forward clutch and the intermediate shaft as a forward output and is transmitted to the output shaft via the reverse idler shaft, the reverse clutch, and the intermediate shaft as a reverse output.

In the first aspect of the present invention, the outboard motor may further include a forward gear group. The forward gear group may include a first forward drive gear, a second forward drive gear, a first forward driven gear, and a second forward driven gear. The first forward drive gear may be on the input shaft. The second forward drive gear may be on the input shaft. The first forward driven gear may be disposed on the intermediate shaft and may be engaged with the first forward drive gear. The second forward driven gear may be disposed on the intermediate shaft and may be engaged with the second forward drive gear. The forward gear group may be configured to transmit power from the input shaft to the intermediate shaft. The forward clutch may include a first forward clutch and a second forward clutch. The first forward clutch may be configured to connect and disconnect power transmission between the intermediate shaft and the first forward driven gear. The second forward clutch may be configured to connect and disconnect power transmission between the input shaft and the second forward drive gear.

In the first aspect of the present invention, the outboard motor may further include an output gear group and an input shaft retaining bearing. The output gear group may include output gears and may be configured to transmit power from the intermediate shaft to the output shaft. The input shaft retaining bearing may be disposed inward of one of the output gears that is disposed on the output shaft. The input shaft retaining bearing may be configured to support one end of the input shaft to be freely rotational.

In the first aspect of the present invention, the outboard motor may further include a corotation prevention device coupled to the intermediate shaft.

According to another aspect of the present invention, an outboard motor includes an engine, a lower gear mechanism, and a transmission. The engine includes an output portion. The lower gear mechanism is configured to drive a propeller disposed below the engine. The transmission is between the engine and the lower gear mechanism. The transmission includes an input shaft, an output shaft, a main relay shaft, a reverse relay shaft, a forward gear, a reverse gear, a forward clutch, a reverse clutch, a forward output gear, a reverse output gear, and a forward/reverse switching clutch. The input shaft is configured to transmit power from the output portion of the engine to the transmission. The output shaft is configured to transmit power from the transmission to the lower gear mechanism. The main relay shaft is configured to relay the power transmitted to the input shaft to the output shaft. The reverse relay shaft is configured to further relay rotational power of the main relay shaft to the output shaft. The forward gear is disposed on the main relay shaft. The reverse gear is disposed on the main relay shaft. The forward clutch is disposed on the main relay shaft and is configured to connect and disconnect power transmission to the forward gear. The reverse clutch is disposed on the main relay shaft and is configured to connect and disconnect power transmission to the reverse gear. The forward output gear is disposed on the output shaft and is engaged with the forward gear. The reverse output gear is disposed on the output shaft and is engaged with the reverse gear. The forward/reverse switching clutch is disposed on the output shaft and is configured to connect and disconnect power transmission to the reverse output gear. During forward traveling, the forward clutch is coupled, and the reverse clutch is disconnected. During reverse traveling, the reverse clutch and the forward/reverse switching clutch are both coupled, and the forward clutch is disconnected.

In the second aspect of the present invention, in a neutral state, the forward clutch and the reverse clutch may both be disconnected, and the forward/reverse switching clutch may be coupled.

In the second aspect of the present invention, the forward clutch and the reverse clutch may both include a hydraulic clutch, and the forward/reverse switching clutch may include an interference clutch.

In the second aspect of the present invention, the forward gear may include a forward low-speed gear loosely fitted to the main relay shaft, and the forward output gear may include a low-speed output gear fixed to the output shaft. The reverse gear and a forward high-speed gear may be coupled to form a forward high-speed and reverse gear loosely fitted to the main relay shaft. The forward clutch may include a forward low-speed clutch configured to connect and disconnect power transmission from the main relay shaft to the forward low-speed gear. The reverse clutch may include a forward high-speed and reverse clutch configured to connect and disconnect power transmission from the main relay shaft to the forward high-speed and reverse gear. The forward/reverse switching clutch may be configured to select one of the forward high-speed output gear and the reverse output gear that are loosely fitted to the output shaft to couple either the forward high-speed output gear or the reverse output gear to the output shaft. During forward low-speed traveling, the forward low-speed clutch may be coupled, and the forward/reverse switching clutch may be disconnected. During forward high-speed traveling, the forward low-speed clutch may be disconnected, the forward/reverse switching clutch may be coupled, and the forward/reverse switching clutch may couple the forward high-speed output gear to the output shaft. During reverse traveling, the forward low-speed clutch may be disconnected, the forward/reverse switching clutch may be coupled, and the forward/reverse switching clutch may couple the reverse output gear to the output shaft.

In the second aspect of the present invention, the output portion of the engine and the input shaft, the output shaft, and the relay shaft of the transmission may extend along an approximately vertical axis.

According to the other aspect of the present invention, an outboard motor includes an engine, a lower gear mechanism, and a transmission. The engine includes an output portion. The lower gear mechanism is configured to drive a propeller disposed below the engine. The transmission is between the engine and the lower gear mechanism. The transmission includes an input shaft, an output shaft, a forward shaft, a reverse shaft, a forward gear, a forward clutch, a reverse relay gear, a reverse gear, and a reverse clutch. The input shaft is configured to transmit power from the output portion of the engine to the transmission. The output shaft is configured to transmit power from the transmission to the lower gear mechanism. The reverse shaft is disposed parallel to the forward shaft along an approximately vertical axis. The forward gear is disposed on the forward shaft. The forward clutch is disposed on the forward shaft and is configured to connect and disconnect power transmission to the forward gear. The reverse relay gear is disposed on the forward shaft. The reverse gear is disposed on the reverse shaft. The reverse clutch is disposed on the reverse shaft and is configured to connect and disconnect power transmission to the reverse gear. The power transmitted from the input shaft via the forward shaft is transmitted to the output shaft via the forward gear as a forward output. The power transmitted from the input shaft via the reverse shaft is transmitted to the output shaft via the reverse gear and the reverse relay gear as a reverse output.

In the third aspect of the present invention, the forward gear and the reverse relay gear may be coupled to form a forward/reverse relay gear. A one-way clutch may be disposed between the forward shaft and the forward/reverse relay gear. The one-way clutch may transmit forward output from the forward shaft to the forward/reverse relay gear, but may not transmit the forward output in reverse.

In the third aspect of the present invention, the forward gear may include a forward low-speed gear and a forward high-speed gear. The forward clutch may include a forward low-speed clutch configured to connect and disconnect power transmission from the input shaft to the forward shaft and a forward high-speed clutch configured to connect and disconnect power transmission from the forward shaft to the forward high-speed gear. The forward low-speed clutch and the forward high-speed clutch may each include a hydraulic multi-plate clutch. The forward low-speed gear and the reverse relay gear may be coupled to form the forward/reverse relay gear.

In the third aspect of the present invention, one of the input shaft and the reverse shaft may be coupled to a hydraulic source of the forward clutch. The hydraulic source may include a hydraulic pump.

In the outboard motor of the present invention, the propeller may include a contra-rotating propeller comprising a front propeller and a rear propeller that are disposed in series and are configured to be drivingly rotated in opposite directions from each other.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
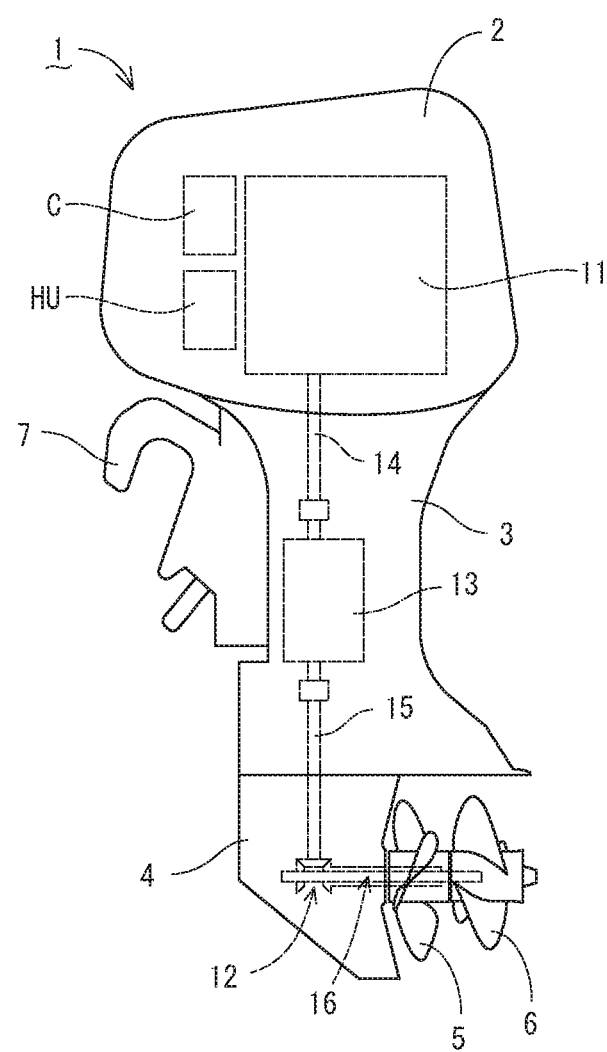
FIG. 1 is a schematic side view of an outboard motor according to a first embodiment.

The embodiments will now be described with reference to the accompanying drawings, wherein like reference numerals designate corresponding or identical elements throughout the various drawings.

First, an overview of an outboard motor 1 will be described with reference to, for example, FIG. 1. As illustrated in FIG. 1, the outboard motor 1 includes an engine cover 2, an intermediate housing 3, and a lower unit case 4 from the top in this order. These components configure a housing (exterior) of the outboard motor 1. A propeller of the outboard motor 1 is provided on the rear side of the lower unit case 4. The propeller includes a front propeller 5 and a rear propeller 6 that are arranged in series. The front and rear propellers 5 and 6 configure a contra-rotating propeller in which the front and rear propellers 5 and 6 are drivingly rotated in opposite directions from each other. A bracket 7 is provided on the front side of the intermediate housing 3. The bracket 7 supports the outboard motor 1 on a hull (not shown). The outboard motor 1 is secured to, for example, a transom of the hull via the bracket 7. In general, the outboard motor 1 is coupled to the bracket 7 to be able to pivot laterally. The bracket 7 is coupled to, for example, the transom of the hull to be able to pivot vertically.

The outboard motor 1 of the first embodiment includes a driving source, which is an engine 11 in this embodiment, a lower gear mechanism 12, a transmission 13, an input shaft 14, and an output shaft 15. The lower gear mechanism 12 is located below the engine 11 and drives the front and rear propellers 5 and 6. The transmission 13 is located between the engine 11 and the lower gear mechanism 12. The input shaft 14 transmits power from the engine 11 to the transmission 13. The output shaft 15 transmits power from the transmission 13 to the lower gear mechanism 12.

The engine 11 is mounted inside the engine cover 2. The engine 11 of the first embodiment is a vertical water-cooled engine, in which the engine output shaft, that is, the crankshaft (not shown) extends in the vertical direction. The lower gear mechanism 12 is accommodated in the lower unit case 4. The lower unit case 4 rotationally supports a laterally extending propeller shaft 16 that drivingly rotates the front and rear propellers 5 and 6. The transmission 13 is accommodated in the intermediate housing 3. The transmission 13 of the first embodiment has a function to shift the rotational power of the engine among a plurality of speeds (in this case, two speeds including a forward low speed and a forward high speed) and a function to switch the rotational output of the front and rear propellers 5 and 6 between forward rotation and reverse rotation.

The upper end section of the input shaft 14 is coupled to the crankshaft of the engine 11. The lower end section of the input shaft 14 projects in a transmission case 22 (refer to FIG. 2) constituting the transmission 13 and is rotationally supported by the transmission case 22. The upper end section of the output shaft 15 projects in the transmission case 22 and is rotationally supported by the transmission case 22. The lower end section of the output shaft 15 is coupled to the lower gear mechanism 12. The input shaft 14 and the output shaft 15 extend in the vertical direction and are coaxial. The rotational power of the engine 11 is transmitted to the front and rear propellers 5 and 6 via the input shaft 14, the transmission 13, the output shaft 15, the lower gear mechanism 12, and the propeller shaft 16.

Figure 2:
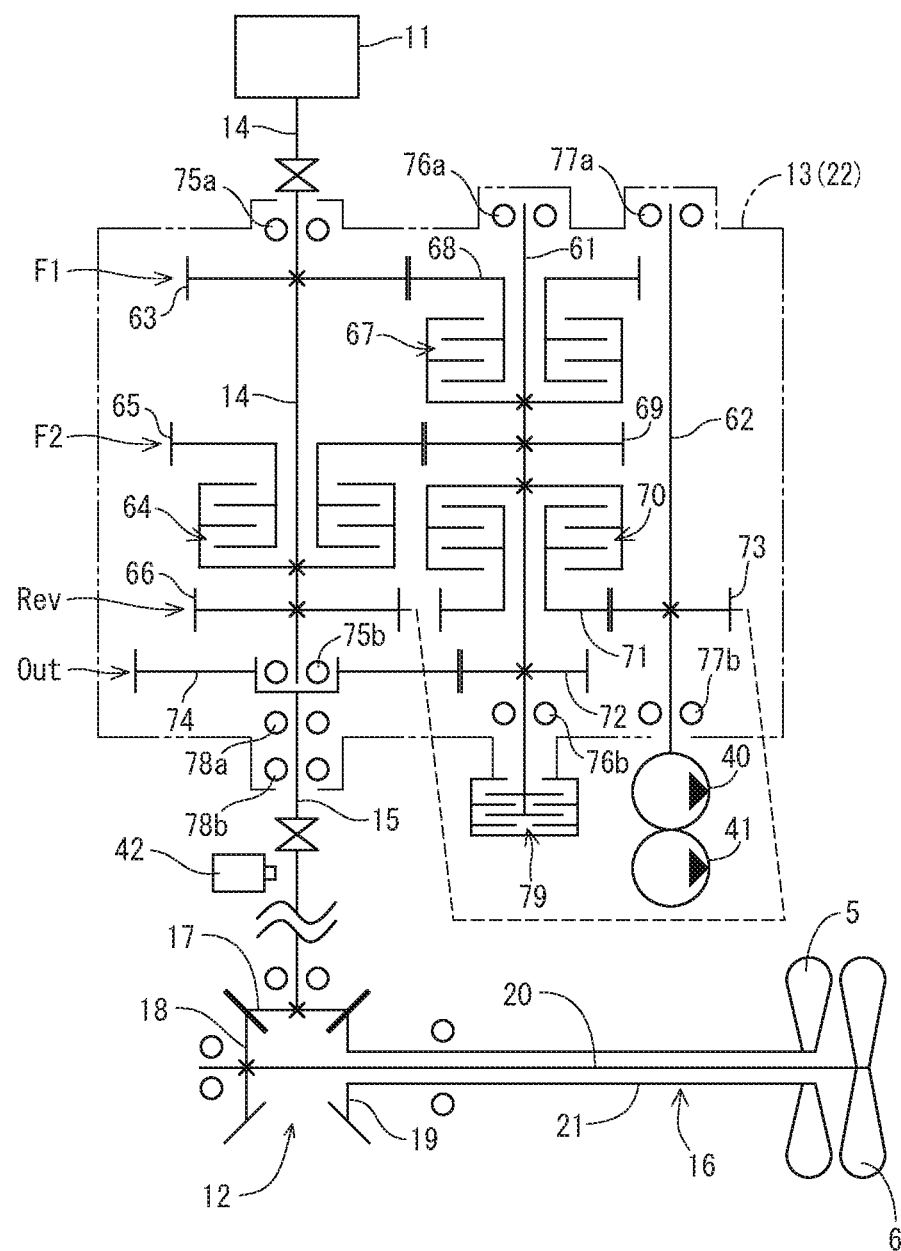
FIG. 2 is a single-line diagram illustrating a power transmission system of the outboard motor.
Figure 3:
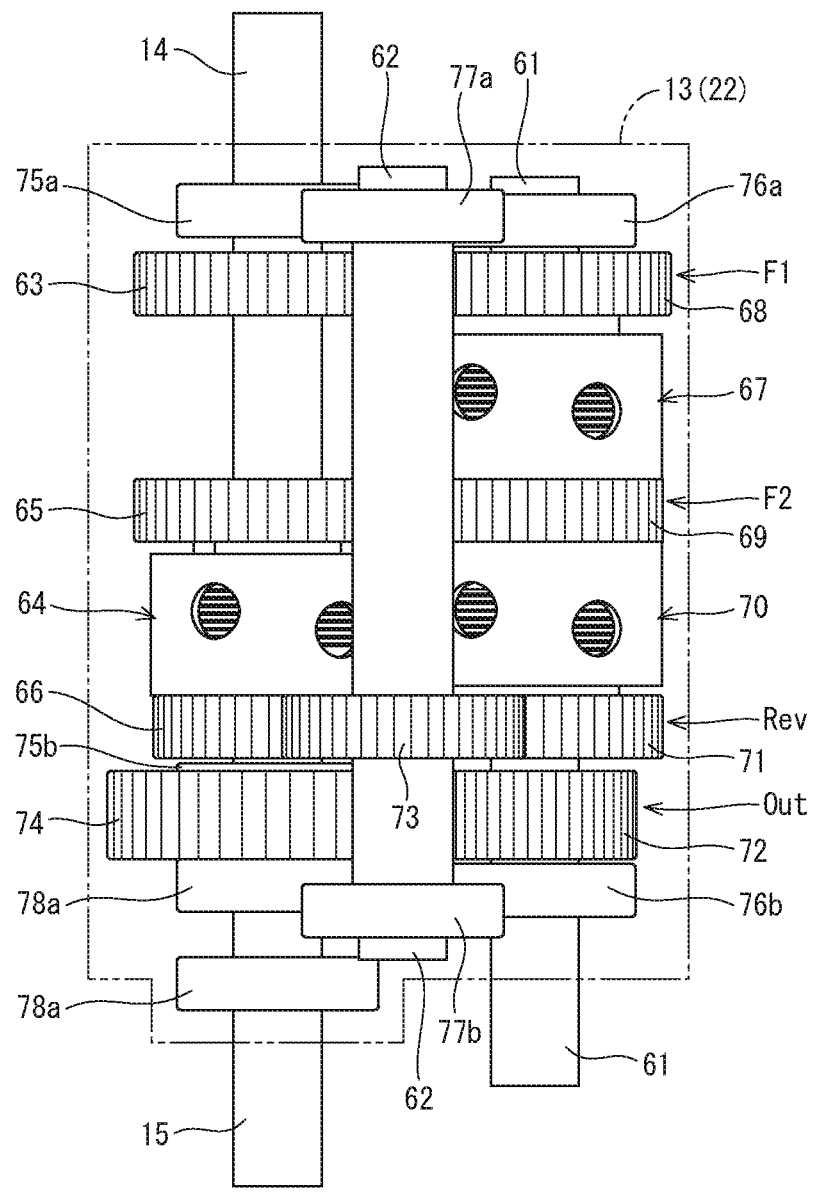
FIG. 3 is a schematic side view of the transmission illustrating the internal structure.
Figure 4:
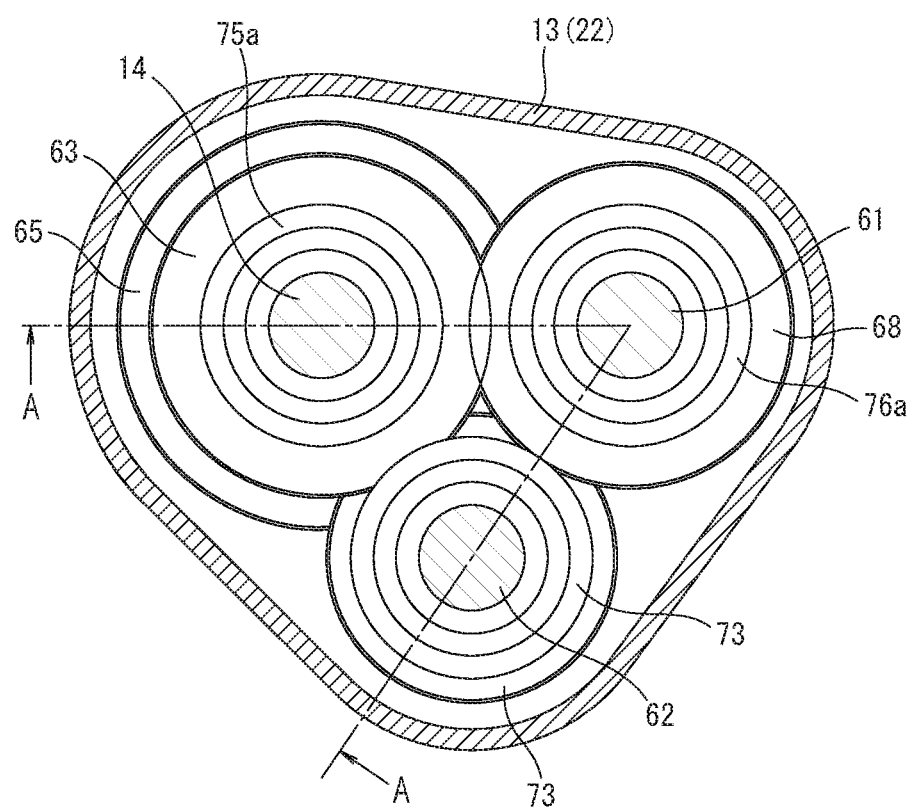
FIG. 4 is a cross-sectional plan view of the transmission illustrating the internal structure.

As illustrated in FIG. 2, the lower gear mechanism 12 includes a drive bevel gear 17 and a pair of front and rear driven bevel gears 18 and 19. The drive bevel gear 17 is fixed to the lower end of the output shaft 15. The front and rear driven bevel gears 18 and 19 are constantly engaged with the drive bevel gear 17. The front and rear driven bevel gears 18 and 19 are referred to as first and second driven bevel gears 18 and 19. The propeller shaft 16 includes an internal shaft 20 and an outer cylindrical shaft 21. The internal shaft 20 and the outer cylindrical shaft 21 are rotational opposite to each other. The internal shaft 20 and the outer cylindrical shaft 21 are coaxial and extend in the lateral direction (refer to FIG. 2). That is, the propeller shaft 16 has a coaxial structure. The first driven bevel gear 18 is fixed on the front end section of the internal shaft 20, and the second driven bevel gear 19 is fixed on the front end section of the outer cylindrical shaft 21. The rear end sections of the internal shaft 20 and the outer cylindrical shaft 21 project rearward from the lower unit case 4. The front propeller 5 is secured to the rear projecting end of the outer cylindrical shaft 21, and the rear propeller 6 is secured to the rear projecting end of the internal shaft 20.

The rotational power of the output shaft 15 is transmitted from the drive bevel gear 17 to both the first driven bevel gear 18 and the second driven bevel gear 19. The first driven bevel gear 18 and the second driven bevel gear 19 are rotated in opposite directions from each other due to the positional relationship between the drive bevel gear 17 and the first driven bevel gear 18, which are engaged with each other, and the positional relationship between the drive bevel gear 17 and the second driven bevel gear 19, which are engaged with each other. Thus, the internal shaft 20 and the outer cylindrical shaft 21, and consequently the front propeller 5 and the rear propeller 6 are drivingly rotated in opposite directions from each other.

Next, the internal structure and the power transmission system of the transmission 13 will be described with reference to FIGS. 2 to 5. The lower end section of the input shaft 14 is rotationally supported on the upper plate portion of the transmission case 22 of the transmission 13. The upper end section of the output shaft 15 is rotationally supported on the lower plate portion of the transmission case 22. An intermediate shaft 61 and a reverse idler shaft 62 are rotationally supported in the transmission case 22 of the transmission 13. The intermediate shaft 61 and the reverse idler shaft 62 extend vertically and are arranged side by side. Thus, the input and output shafts 14 and 15, which are coaxial with each other, the intermediate shaft 61, and the reverse idler shaft 62 extend vertically in parallel to one another. Furthermore, the input and output shafts 14 and 15, the intermediate shaft 61, and the reverse idler shaft 62 are located at positions that form vertexes of an approximately triangular shape in a cross-sectional plan view (refer to FIG. 4).

The input shaft 14 supports a forward low-speed drive gear 63 (first forward drive gear), a forward high-speed drive gear 65 (second forward drive gear), and a reverse drive gear 66 in this order from the top. The forward low-speed drive gear 63 and the reverse drive gear 66 are fixed to the input shaft 14. The forward high-speed drive gear 65 is loosely fitted to the input shaft 14 via a forward high-speed clutch 64 (second forward clutch) to be capable of connecting and disconnecting power. The intermediate shaft 61 supports a forward low-speed driven gear 68 (first forward driven gear), a forward high-speed driven gear 69 (second forward driven gear), a reverse driven gear 71, and an output drive gear 72 in this order from the top. The forward low-speed driven gear 68 is loosely fitted to the intermediate shaft 61 via a forward low-speed clutch 67 (first forward clutch) to be capable of connecting and disconnecting power. The forward high-speed driven gear 69 and the output drive gear 72 are fixed to the intermediate shaft 61. The reverse driven gear 71 is loosely fitted to the intermediate shaft 61 via a reverse clutch 70 to be capable of connecting and disconnecting the power. A reverse idler gear 73 is fixed to the reverse idler shaft 62. An output driven gear 74 is fixed to the upper end section of the output shaft 15.

The forward low-speed drive gear 63 and the forward low-speed driven gear 68 are constantly engaged, and the gears 63 and 68 configure a forward low-speed gear group F1. The forward high-speed drive gear 65 and the forward high-speed driven gear 69 are constantly engaged, and the gears 65 and 69 configure a forward high-speed gear group F2. The reverse idler gear 73 is constantly engaged with the reverse drive gear 66 and the reverse driven gear 71, and the gears 66, 71, and 73 configure a reverse gear group Rev. The output drive gear 72 and the output driven gear 74 are constantly engaged, and the gears 72 and 74 configure an output gear group Out.

The forward high-speed clutch 64 connects and disconnects the power transmission from the input shaft 14 to the forward high-speed drive gear 65. The forward low-speed clutch 67 connects and disconnects the power transmission from the forward low-speed driven gear 68 to the intermediate shaft 61. The reverse clutch 70 connects and disconnects the power transmission from the reverse driven gear 71 to the intermediate shaft 61. In the first embodiment, the clutches 64, 67, and 70 are hydraulic multi-plate clutches. The friction plates of the clutches 64, 67, and 70 are pressed together by hydraulic oil pressure to couple the input shaft 14 and the output shaft 15 to be capable of transmitting power.

That is, when the forward low-speed clutch 67 is coupled, and the forward high-speed clutch 64 and the reverse clutch 70 are disconnected, the forward low-speed driven gear 68 is coupled to the intermediate shaft 61 via the forward low-speed clutch 67 to be unable to rotate relative to each other. Thus, the rotational power of the engine 11 is transmitted from the input shaft 14 to the intermediate shaft 61 via the forward low-speed gear group F1 and the forward low-speed clutch 67 and is transmitted from the intermediate shaft 61 to the output shaft 15 via the output gear group Out as a forward low-speed output. As a result, the transmission 13 is brought into a forward low-speed state in which the rotational power of the engine 11 is transmitted to the output shaft 15 as the forward low-speed output.

When the forward high-speed clutch 64 is coupled, and the forward low-speed clutch 67 and the reverse clutch 70 are disconnected, the forward high-speed drive gear 65 is coupled to the input shaft 14 via the forward high-speed clutch 64 to be unable to rotate relative to each other. Thus, the rotational power of the engine 11 is transmitted from the input shaft 14 to the intermediate shaft 61 via the forward high-speed clutch 64 and the forward high-speed gear group F2 and is transmitted from the intermediate shaft 61 to the output shaft 15 via the output gear group Out as a forward high-speed output. As a result, the transmission 13 is brought into a forward high-speed state in which the rotational power of the engine 11 is transmitted to the output shaft 15 as the forward high-speed output.

Furthermore, when the reverse clutch 70 is coupled, and the forward low-speed clutch 67 and the forward high-speed clutch 64 are disconnected, the reverse driven gear 71 is coupled to the intermediate shaft 61 via the reverse clutch 70 to be unable to rotate relative to each other. Thus, the rotational power of the engine 11 is transmitted from the input shaft 14 to the intermediate shaft 61 via the reverse gear group Rev and the reverse clutch 70 and is transmitted from the intermediate shaft 61 to the output shaft 15 via the output gear group Out as a reverse output. As a result, the transmission 13 is brought into a reverse state in which the rotational power of the engine 11 is transmitted to the output shaft 15 as the reverse output.

When the forward low-speed clutch 67, the forward high-speed clutch 64, and the reverse clutch 70 are all disconnected, the transmission 13 is brought into a neutral state in which the rotational power of the engine 11 is not transmitted to the output shaft 15. In the neutral state, rotation of the intermediate shaft 61 is braked by a corotation prevention device 79 (refer to FIGS. 2 and 5), which will be discussed below, and corotation of the intermediate shaft 61 is prevented.

In summary, the rotational power of the input shaft 14 is transmitted to the output shaft 15 as the forward output (the forward low-speed output or the forward high-speed output) via the forward low-speed gear group F1 or the forward high-speed gear group F2, the intermediate shaft 61, and the output gear group Out and is transmitted to the output shaft 15 as the reverse output via the reverse gear group Rev, the intermediate shaft 61, and the output gear group Out.

The upper end portion of the intermediate shaft 61 extends through the upper plate portion of the transmission case 22 and is covered with an oil passage relay member 22b. Oil supply ports 64a, 67a, and 70a are formed in the oil passage relay member 22b so that the oil passage relay member 22b is connected to a hydraulic circuit 80, which will be discussed below. Oil is supplied to the clutches 64, 67, and 70 through the oil passages in the input shaft 14 and the intermediate shaft 61. The oil that flows through an oil supply port 91a is discharged toward the friction plates of the clutches 64, 67, and 70 through the oil passages in the input shaft 14 and the intermediate shaft 61.

The rotational speed of the output shaft 15 is detected using a rotational speed detection sensor 42 (refer to FIG. 2). Depending on the relationship between the rotational speeds of the engine 11 and the output shaft 15, the connection and disconnection of the forward low-speed clutch 67 and the forward high-speed clutch 64 may be configured to be automatically controlled, or may be configured to be manually controlled with, for example, a lever. The connection and disconnection of the reverse clutch 70 are controlled manually with, for example, a lever.

In the first embodiment, the reverse idler shaft 62 is configured to be constantly rotated by the rotational power when the engine 11 is driven. The lower end of the reverse idler shaft 62 projects downward from the lower plate portion of the transmission case 22 and provides a power take-off function for driving auxiliary pumps. A clutch pump 40 and a coolant pump 41 are coupled to the projecting end portion of the reverse idler shaft 62. The clutch pump 40 supplies hydraulic oil to the forward low-speed clutch 67, the forward high-speed clutch 64, and the reverse clutch 70. The coolant pump 41 circulates coolant for cooling the engine 11. The clutch pump 40 and the coolant pump 41 are examples of the auxiliary pumps.

Thus, the transmission 13 of the first embodiment also has a function to branch the rotational power of the engine 11 to the auxiliary devices, which are the clutch pump 40 and the coolant pump 41 in this embodiment. The transmission 13, the clutch pump 40, and the coolant pump 41 are integrally mounted to form a unit.

The concept of the auxiliary pumps also includes a steering hydraulic pump for steering the outboard motor and a tilt and trim hydraulic pump for vertically pivoting the outboard motor. These auxiliary pumps may be secured to the reverse idler shaft 62 in tandem. The number of pumps secured to the reverse idler shaft 62 may be one.

Figure 5:
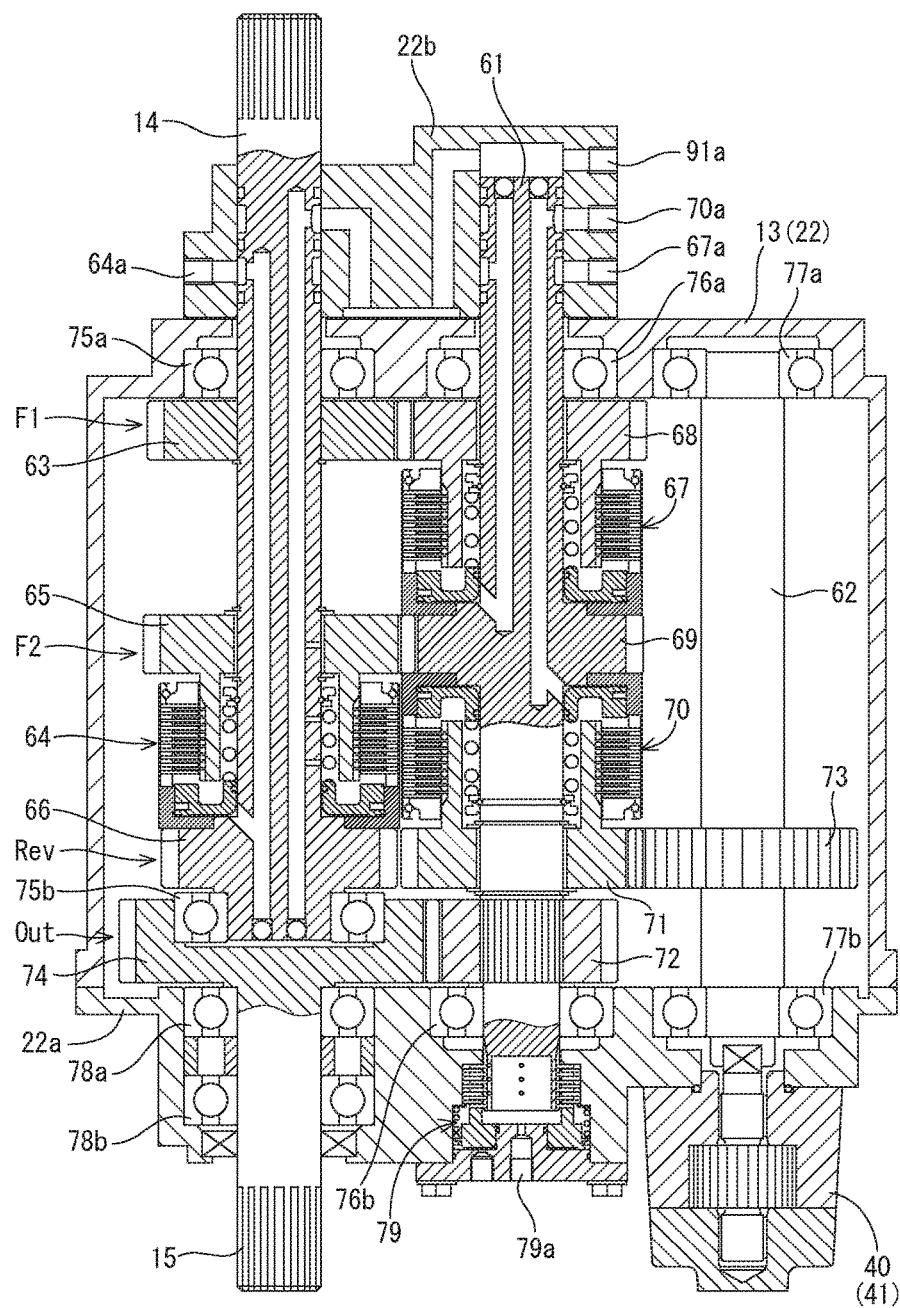
FIG. 5 is a cross-sectional view taken along the line A-A of FIG. 4.

In the first embodiment, the input shaft 14 and the output shaft 15 are coaxial as illustrated in FIGS. 2 and 5. An input shaft retaining bearing 75b rotationally supports the lower end (one end) of the input shaft 14. The input shaft retaining bearing 75b is located on the output shaft 15 inward of the output driven gear 74 of the output gear group Out, which is located on the intermediate shaft 61 and the output shaft 15. A recess is formed in the surface of the output driven gear 74 facing the input shaft 14. The input shaft retaining bearing 75b is located in the recess. Since the input shaft retaining bearing 75b, which supports the lower end of the input shaft 14, is located inside the output driven gear 74, it is unnecessary to provide a section that supports the bearing, which supports the lower end of the input shaft 14, in the transmission case 22. Thus, the transmission case 22 is simplified, and the size of the entire transmission 13 is further reduced.

As illustrated in FIGS. 2 and 5, the upper end section of the input shaft 14, the upper end section of the intermediate shaft 61, and the upper end section of the reverse idler shaft 62 are supported by bearings 75a, 76a, and 77a to be freely rotational. The bearings 75a, 76a, and 77a are supported on the upper plate portion of the transmission case 22. The lower end section of the intermediate shaft 61 and the lower end section of the reverse idler shaft 62 are supported by bearings 76b and 77b to be freely rotational. The bearings 76b and 77b are supported by the lower plate portion of the transmission case 22. The output shaft 15 is supported by bearings 78a and 78b to be freely rotational. The bearings 78a and 78b are supported by the lower plate portion of the transmission case 22.

In the first embodiment, the lower end of the intermediate shaft 61 is located in a brake chamber provided in a lid member 22a. The lid member 22a configures the lower plate portion of the transmission case 22. In the brake chamber, the corotation prevention device 79, which prevents corotation of the intermediate shaft 61 during the neutral state, is coupled to the lower end section of the intermediate shaft 61. The transmission 13 and the corotation prevention device 79 are integrally mounted to form a unit. In the neutral state, in which the rotational power of the engine 11 is not transmitted to the output shaft 15, the corotation prevention device 79 is operated by the hydraulic pressure supply through an oil supply port 79a to brake the rotation of the intermediate shaft 61. This prevents the corotation of the intermediate shaft 61 and thus prevents the corotation of the output shaft 15.

Figure 6:
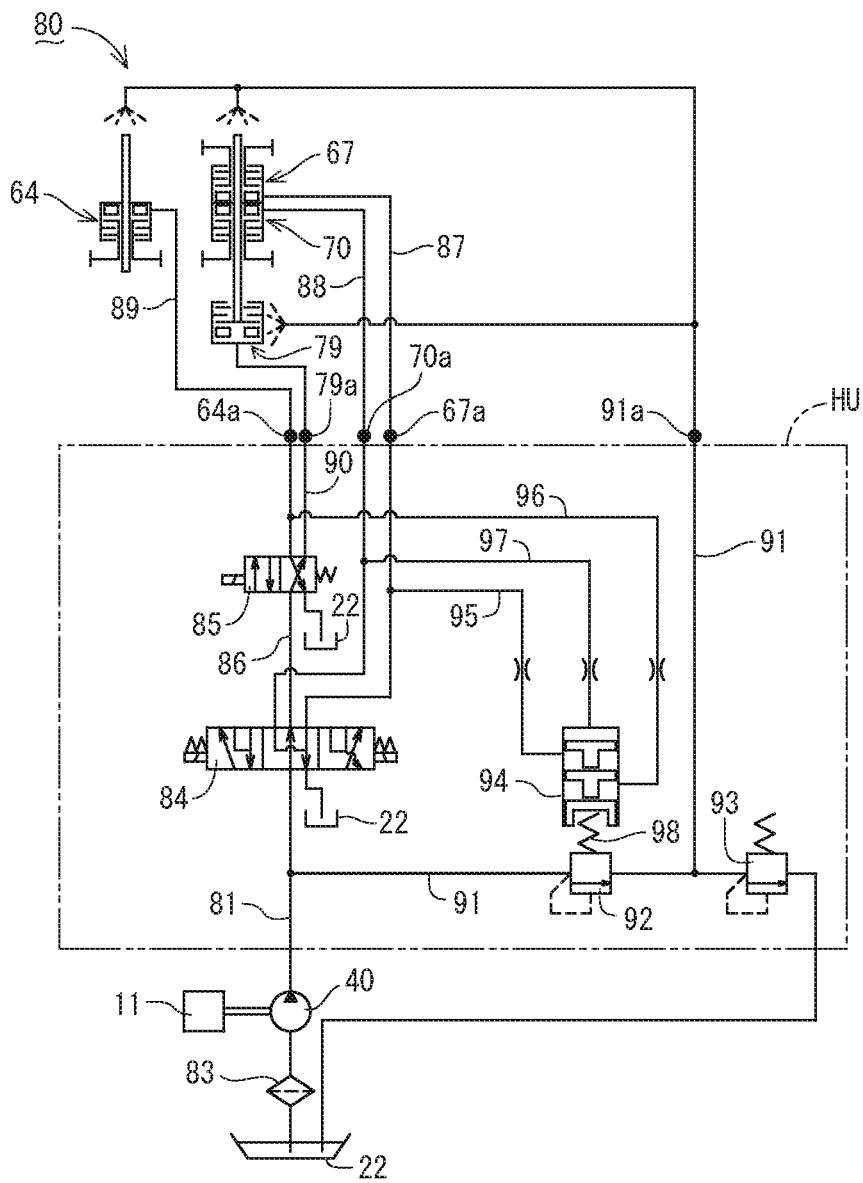
FIG. 6 is a hydraulic circuit diagram of the outboard motor.

Next, the configuration of the hydraulic circuit 80 of the outboard motor 1 (the transmission 13) will be described with reference to FIG. 6. The hydraulic circuit 80 of the outboard motor 1 includes the clutch pump 40, which is driven by the rotational power of the engine 11. As described above, the clutch pump 40 supplies hydraulic oil to the forward low-speed clutch 67, the forward high-speed clutch 64, and the reverse clutch 70. The clutch pump 40 is located at the middle portion of a hydraulic oil passage 81. The hydraulic oil passage 81 is coupled to a hydraulic oil tank, which is the transmission case 22 in this embodiment. A strainer 83 is located on the suction side of the clutch pump 40 in the hydraulic oil passage 81.

In the hydraulic oil passage 81, the discharge side of the clutch pump 40 is coupled to a forward high-speed neutral oil passage 86, a forward low-speed oil passage 87, or a reverse oil passage 88 via a forward/reverse switching valve 84. The forward high-speed neutral oil passage 86 extends toward a forward high-speed neutral switching valve 85. The forward low-speed oil passage 87 extends toward the forward low-speed clutch 67. The reverse oil passage 88 extends toward the reverse clutch 70. The forward high-speed neutral oil passage 86 is coupled to a forward high-speed oil passage 89 or a neutral oil passage 90 via the forward high-speed neutral switching valve 85. The forward high-speed oil passage 89 extends toward the forward high-speed clutch 64. The neutral oil passage 90 extends toward the corotation prevention device 79. The hydraulic oil is selectively supplied to any of the forward low-speed clutch 67, the forward high-speed clutch 64, the reverse clutch 70, and the corotation prevention device 79 depending on the combination of the switching operation of the forward/reverse switching valve 84 and the forward high-speed neutral switching valve 85.

A lubricant passage 91 branches from the middle portion of the hydraulic oil passage 81. The lubricant passage 91 supplies lubricant, which is the hydraulic oil in this embodiment, to the forward low-speed clutch 67, the forward high-speed clutch 64, the reverse clutch 70, and the corotation prevention device 79. A hydraulic oil pressure regulating valve 92 and a lubricant pressure regulating valve 93 are provided in the lubricant passage 91 in this order from the upstream end. The hydraulic oil pressure regulating valve 92 is a relief valve for setting the clutch working pressure in the hydraulic oil passage 81. The hydraulic oil that has passed through the hydraulic oil pressure regulating valve 92 is kept at a low pressure by the lubricant pressure regulating valve 93 and is supplied to the forward low-speed clutch 67, the forward high-speed clutch 64, the reverse clutch 70, and the corotation prevention device 79 as coolant and lubricant for the friction plates. Unnecessary hydraulic oil that causes the pressure to be equal to or greater than a predetermined pressure is returned from the lubricant pressure regulating valve 93 to the transmission case 22.

The hydraulic oil pressure regulating valve 92 includes a slowly fitting valve 94. The slowly fitting valve 94 increments the oil pressure to a predetermined pressure of the hydraulic oil pressure regulating valve 92 in proportion to the time in order to reduce the shock generated when the clutch is coupled at the time of switching forward or reverse.

The slowly fitting valve 94 is coupled to a forward low-speed back-pressure oil passage 95, a forward high-speed back-pressure oil passage 96, and a reverse back-pressure oil passage 97 via respective throttle valves. The forward low-speed back-pressure oil passage 95 branches from the forward low-speed oil passage 87. The forward high-speed back-pressure oil passage 96 branches from the forward high-speed oil passage 89. The reverse back-pressure oil passage 97 branches from the reverse oil passage 88. The slowly fitting valve 94 is configured to gradually increase the hydraulic oil pressure to the forward low-speed clutch 67, the forward high-speed clutch 64, or the reverse clutch 70 by the back-pressure introduced from the back-pressure oil passages 95 to 97 so as to reduce the shock generated when the clutch is coupled at the time of switching forward or reverse.

When the hydraulic oil passage 81 is coupled to the corotation prevention device 79 via the forward/reverse switching valve 84, the forward high-speed neutral oil passage 86, the forward high-speed neutral switching valve 85, and the neutral oil passage 90, the hydraulic oil pressure regulating valve 92 opens in accordance with the hydraulic oil pressure that flows through the lubricant passage 91. When the forward/reverse switching valve 84 and the forward high-speed neutral switching valve 85 are activated so that the hydraulic oil passage 81 is coupled to any of the forward low-speed oil passage 87, the forward high-speed oil passage 89, and the reverse oil passage 88, the hydraulic oil flows into the slowly fitting valve 94 through the corresponding one of the back-pressure oil passages 95 to 97 to close the hydraulic oil pressure regulating valve 92. A relief spring 98 is located between the hydraulic oil pressure regulating valve 92 and the slowly fitting valve 94. With the compression of the relief spring 98, the hydraulic oil pressure regulating valve 92 is operated more slowly than the slowly fitting valve 94 to be gradually brought into a closed state. Thus, the hydraulic oil pressure to the forward low-speed clutch 67, the forward high-speed clutch 64, or the reverse clutch 70 is gradually increased, and the forward low-speed clutch 67, the forward high-speed clutch 64, or the reverse clutch 70 is gradually brought into a coupled state (engaged state). As a result, the shock generated at the time of coupling the clutches 64, 67, and 70 is reduced. These valves are collected as a hydraulic unit HU and are arranged adjacent to the engine 11 in the engine cover 2 illustrated in FIG. 1. A controller C drivingly controls various electromagnetic valves.

As is clear from the above description and FIGS. 2 to 5, according to the outboard motor 1 of the first embodiment, the power of the input shaft 14 is transmitted to the output shaft 15 via the forward clutches 64 or 67 and the intermediate shaft 61 as the forward output and is transmitted to the output shaft 15 via the reverse idler shaft 62, the reverse clutch 70, and the intermediate shaft 61 as the reverse output. Thus, although the transmission 13 includes a mechanism for switching the rotational output of the front and rear propellers 5 and 6 between the forward rotation and the reverse rotation, the transmission 13 has a simple structure and reduced size and costs. This also contributes to reducing the size of the outboard motor 1.

According to the outboard motor 1 of the first embodiment, the forward low-speed drive gear 63 and the forward high-speed drive gear 65 are located on the input shaft 14, and the forward low-speed driven gear 68 and the forward high-speed driven gear 69 are located on the intermediate shaft 61. The forward low-speed drive gear 63, the forward high-speed drive gear 65, the forward low-speed driven gear 68, and the forward high-speed driven gear 69 configure the forward gear groups F1 and F2, which transmit power from the input shaft 14 to the intermediate shaft 61. The forward low-speed clutch 67, which connects and disconnects power transmission between the intermediate shaft 61 and the forward low-speed driven gear 68, and the forward high-speed clutch 64, which connects and disconnects power transmission between the input shaft 14 and the forward high-speed drive gear 65, are provided as the forward clutches. Thus, while the transmission 13 has a simple structure and reduced size and costs, the forward drive can be shifted to two speeds, that is, the forward low-speed and the forward high-speed. This allows selecting one of the forward gear groups F1 and F2 having a gear ratio that suits the condition as necessary to exert a suitable output and to enable an appropriate traveling.

Since the clutches 64 and 67 are distributed to the input shaft 14 and the intermediate shaft 61, the length of the intermediate shaft 61 is reduced, and the size of the transmission 13 is reduced compared with a case in which three clutches 64, 67, and 70 are all located on the intermediate shaft 61. The forward low-speed clutch 67, which connects and disconnects the forward low-speed gear group F1, may be located on the input shaft 14. Alternatively, the forward high-speed clutch 64, which connects and disconnects the forward high-speed gear group F2, may be located on the intermediate shaft 61. The forward clutches 64 and 67 may both be located on the input shaft 14.

FIGS. 7 to 10 illustrate a transmission 113 of an outboard motor 1 according to a second embodiment. In the following embodiment, like or the same reference numerals are given to those components that have basically the same configuration and operation as the corresponding components of the first embodiment and detailed explanations are omitted. In the second embodiment, the transmission 113 differs from the transmission of the first embodiment.

In the second embodiment, a transmission case 122 constituting the transmission 113 includes three members including a first case portion 122a, a second case portion 122b, and a third case portion 122c, which are stacked one above the other in the vertical direction. The lower end section of the input shaft 14 and the upper end section of a main relay shaft 123 are rotationally supported on the upper plate portion of the first case portion 122a. The middle portion of the output shaft 15 and the lower end section of the main relay shaft 123 are rotationally supported on the lower plate portion of the third case portion 122c. The upper end portion of the output shaft 15 is inserted in and rotationally supported by the lower end portion of the input shaft 14 via a bearing. A reverse relay shaft 124 is rotationally supported between the second case portion 122b and the third case portion 122c. Thus, the input and output shafts 14 and 15, which are coaxial to each other, the main relay shaft 123, and the reverse relay shaft 124 extend vertically in parallel to one another. Furthermore, the input and output shafts 14 and 15, the main relay shaft 123, and the reverse relay shaft 124 are located at positions that form vertexes of an approximately triangular shape in a cross-sectional plan view (refer to FIG. 9).

An input gear 126, a forward low-speed gear 128, and a forward high-speed and reverse gear 129 are loosely fitted to the main relay shaft 123 in this order from the upstream end. The input gear 126 is constantly engaged with an input branch gear 125. The input branch gear 125 is fixed to the lower end section of the input shaft 14. The forward low-speed gear 128 is coupled to the main relay shaft 123 by a forward low-speed clutch 127, which is a hydraulic multi-plate clutch in this embodiment, to be capable of connecting and disconnecting power. The forward high-speed and reverse gear 129 is coupled to the main relay shaft 123 by a forward high-speed and reverse clutch 130, which is a hydraulic multi-plate clutch in this embodiment, to be capable of connecting and disconnecting power. The forward high-speed and reverse gear 129 is configured by coupling a forward high-speed gear 131 and a reverse gear 132. The forward low-speed clutch 127 connects and disconnects power transmission from the main relay shaft 123 to the forward low-speed gear 128. The forward high-speed and reverse clutch 130 connects and disconnects power transmission from the main relay shaft 123 to the forward high-speed and reverse gear 129. The lower end of the main relay shaft 123 is inserted in a tubular oil passage relay member 122*d*. The tubular oil passage relay member 122*d* is integrally formed with the third case portion 122*c*. The oil passage relay member 122*d* includes oil supply ports 127*a* and 130*a* to communicate with a hydraulic circuit 100, which will be discussed below. Oil can be supplied to the clutches 127 and 130 through an oil passage in the main relay shaft 123. The oil that flows through an oil supply port 151*a* is discharged toward the friction plates of the clutches 127 and 130 of the main relay shaft 123 for lubrication.

The forward low-speed clutch 127 and the forward high-speed and reverse clutch 130 are hydraulic multi-plate clutches. The forward low-speed clutch 127 and the forward high-speed and reverse clutch 130 are provided in a common clutch housing 138 coupled to the main relay shaft 123. That is, the clutch housing 138 has a cylindrical shape that extends vertically along the main relay shaft 123 mainly around the coupling portion between the clutch housing 138 and the main relay shaft 123. The shaft portions of the forward low-speed gear 128 and the forward high-speed and reverse gear 129, which are provided above and below the clutch housing 138, are inserted in the clutch housing 138. The friction plates provided on the inner circumferential surface of the clutch housing 138 and the friction plates provided on the shaft portions of the forward low-speed gear 128 and the forward high-speed and reverse gear 129 are alternately arranged. The hydraulic oil can be drawn in and discharged from a forward low-speed oil passage 145 and a forward high-speed and reverse oil passage 146 in the main relay shaft 123. The forward low-speed clutch 127 and the forward high-speed and reverse clutch 130 are integrally provided at the upper section and the lower section of the clutch housing 138.

When power from the input shaft 14 is input to the main relay shaft 123 via the input branch gear 125 and the input gear 126, the clutch housing 138 is rotated together with the main relay shaft 123. At this time, the forward low-speed gear 128 and the forward high-speed and reverse gear 129 are each supported to be rotational relative to both the main relay shaft 123 and the clutch housing 138. Thus, when the forward low-speed clutch 127 and the forward high-speed and reverse clutch 130 are both disconnected, power from the main relay shaft 123 is not transmitted to the forward low-speed gear 128 or to the forward high-speed and reverse gear 129. When the forward low-speed clutch 127 is coupled, the rotational power of the main relay shaft 123 is transmitted to the forward low-speed gear 128 via the clutch housing 138 and the forward low-speed clutch 127. When the forward high-speed and reverse clutch 130 is coupled, the rotational power of the main relay shaft 123 is transmitted to the forward high-speed and reverse gear 129 via the clutch housing 138 and the forward high-speed and reverse clutch 130.

The forward low-speed gear 128 is constantly engaged with a forward low-speed output gear 133. The forward low-speed output gear 133 is fixed to the upper end section of the output shaft 15. The forward high-speed gear 131, which is a component of the forward high-speed and reverse gear 129, is constantly engaged with a forward high-speed output gear 134. The forward high-speed output gear 134 is loosely fitted to the middle portion of the output shaft 15. The reverse gear 132, which is a component of the forward high-speed and reverse gear 129, is constantly engaged with a reverse output gear 136 via a reverse relay gear 135. The reverse output gear 136 is loosely fitted to the lower end portion of the output shaft 15. The reverse relay gear 135 is fixed to the reverse relay shaft 124. A forward/reverse switching clutch 137 is located on the lower end section of the output shaft 15 at a position between the forward high-speed output gear 134 and the reverse output gear 136. The forward/reverse switching clutch 137 selectively couples to the forward high-speed output gear 134 and the reverse output gear 136 to be capable of connecting and disconnecting power.

The forward/reverse switching clutch 137 includes an interference clutch such as a dog clutch and is engaged with the output shaft 15 to be unable to rotate relative to the output shaft 15 and to be slidable in the axial direction. Thus, the forward/reverse switching clutch 137 is rotated together with the output shaft 15. Output claws are provided on both ends of the forward/reverse switching clutch 137. The output claws are engaged with input claws provided on the forward high-speed output gear 134 and the reverse output gear 136. Thus, when the forward/reverse switching clutch 137 is slid toward the forward high-speed output gear 134, the forward/reverse switching clutch 137 and the forward high-speed output gear 134 are engaged. In this state, the rotational power is transmitted from the forward high-speed output gear 134 to the output shaft 15 via the forward/reverse switching clutch 137. When the forward/reverse switching clutch 137 is slid toward the reverse output gear 136, the forward/reverse switching clutch 137 and the reverse output gear 136 are engaged. In this state, the rotational power is transmitted from the reverse output gear 136 to the output shaft 15 via the forward/reverse switching clutch 137.

The forward/reverse switching clutch 137 is moved vertically in the axial direction of the output shaft 15 by a shifter 159. The shifter 159 is fixed to the middle portion of a piston rod 158. The piston rod 158 is secured to a piston 157. The piston 157 is located in a cylinder 160. The cylinder 160 is provided at part of the outer wall portion of the transmission case 122 to be slidable. The piston rod 158 is placed in the transmission case 122 to be parallel to the output shaft 15 and is urged toward the piston 157 by a spring 161. The spring 161 is located on the piston rod 158 further from the piston 157.

One end of the shifter 159 is securely fitted to the piston rod 158, and the other end of the shifter 159 is securely engaged with the forward/reverse switching clutch 137. The spring 161 is secured by the securing portion of the shifter 159 on the piston rod 158 and the inner wall of the transmission case 122 and urges the piston 157 downward together with the piston rod 158. That is, the piston 157 is urged by the spring 161 in a direction so that the forward/reverse switching clutch 137 is coupled to the reverse output gear 136. The forward/reverse switching clutch 137 is configured by a dog clutch that includes claws. However, for example, a synchronizer including a synchronizer ring may be provided at the coupling portion between the forward/ reverse switching clutch 137 and each of the forward high-speed output gear 134 and the reverse output gear 136.

When the forward low-speed clutch 127 and the forward high-speed and reverse clutch 130 are both in a disconnected state, and the transmission 113 is in the neutral state (state in which power from the engine 11 is not transmitted to the output shaft 15), the forward/reverse switching clutch 137 is coupled to the reverse output gear 136. In this state, the output shaft 15 is coupled to the forward low-speed gear 128 via the forward low-speed output gear 133. The engine power constantly drives the clutch housing 138 via the gears 125 and 126 and the main relay shaft 123. Drag torque generated between the drive side friction plates and the driven side friction plates of the forward low-speed clutch 127 causes the forward low-speed output gear 133 to rotate in the forward direction. Similarly, drag torque generated between the drive side friction plates and the driven side friction plates of the forward high-speed and reverse clutch 130 causes the reverse output gear 136 to rotate in the reverse direction. Thus, the output shaft 15 receives rotational powers from the forward low-speed gear 128 and the reverse output gear 136 in opposite directions from each other. Consequently, the output shaft 15 maintains the neutral state without being influenced by the rotation of the main relay shaft 123 based on the power from the engine 11.

When the forward low-speed clutch 127 is coupled, and the forward high-speed and reverse clutch 130 is disconnected, the forward low-speed gear 128 is coupled to the main relay shaft 123 via the forward low-speed clutch 127 to be unable to rotate relative to each other. Thus, the rotational power of the engine 11 is transmitted from the input branch gear 125 of the input shaft 14 to the main relay shaft 123 via the input gear 126 and is transmitted from the main relay shaft 123 to the forward low-speed output gear 133 via the forward low-speed clutch 127 and the forward low-speed gear 128. In this manner, the rotational power of the engine 11 is transmitted to the output shaft 15 as the forward low-speed output regardless of the slide position of the forward/reverse switching clutch 137. As a result, the transmission 113 is brought into the forward low-speed state in which the rotational power of the engine 11 is transmitted to the output shaft 15 as the forward low-speed output.

When the forward high-speed and reverse clutch 130 is coupled, and the forward low-speed clutch 127 is disconnected, the forward high-speed and reverse gear 129 is coupled to the main relay shaft 123 via the forward high-speed and reverse clutch 130 to be unable to rotate relative to each other. Thus, the rotational power of the engine 11 is transmitted from the input branch gear 125 of the input shaft 14 to the main relay shaft 123 via the input gear 126 and is transmitted from the main relay shaft 123 to the forward high-speed gear 131 and the reverse gear 132 of the forward high-speed and reverse gear 129 via the forward high-speed and reverse clutch 130.

At this time, when the forward/reverse switching clutch 137 is coupled to the forward high-speed output gear 134, the forward high-speed output gear 134 is coupled to the output shaft 15 via the forward/reverse switching clutch 137 to be unable to rotate relative to each other. Thus, the rotational power of the engine 11 transmitted to the main relay shaft 123 is transmitted to the forward high-speed output gear 134 via the forward high-speed gear 131 of the forward high-speed and reverse gear 129 as the forward high-speed output. As a result, the transmission 113 is brought into the forward high-speed state in which the rotational power of the engine 11 is transmitted to the output shaft 15 as the forward high-speed output.

When the forward/reverse switching clutch 137 is coupled to the reverse output gear 136, the reverse output gear 136 is coupled to the output shaft 15 via the forward/reverse switching clutch 137 to be unable to rotate relative to each other. Thus, the rotational power of the engine 11 transmitted to the main relay shaft 123 is transmitted to the reverse output gear 136 via the reverse gear 132 and the reverse relay gear 135 of the forward high-speed and reverse gear 129 as the reverse output. As a result, the transmission 113 is brought into the reverse state in which the rotational power of the engine 11 is transmitted to the output shaft 15 as the reverse output.

In summary, the rotational power that has been transmitted from the input shaft 14 through the main relay shaft 123 is transmitted to the output shaft 15 via the forward low-speed gear 128 or the forward high-speed and reverse gear 129 as the forward output (the forward low-speed output or the forward high-speed output), and the rotational power that has been transmitted through the reverse relay shaft 124 via the forward high-speed and reverse gear 129 is transmitted to the output shaft 15 via the reverse relay gear 135.

Figure 7:
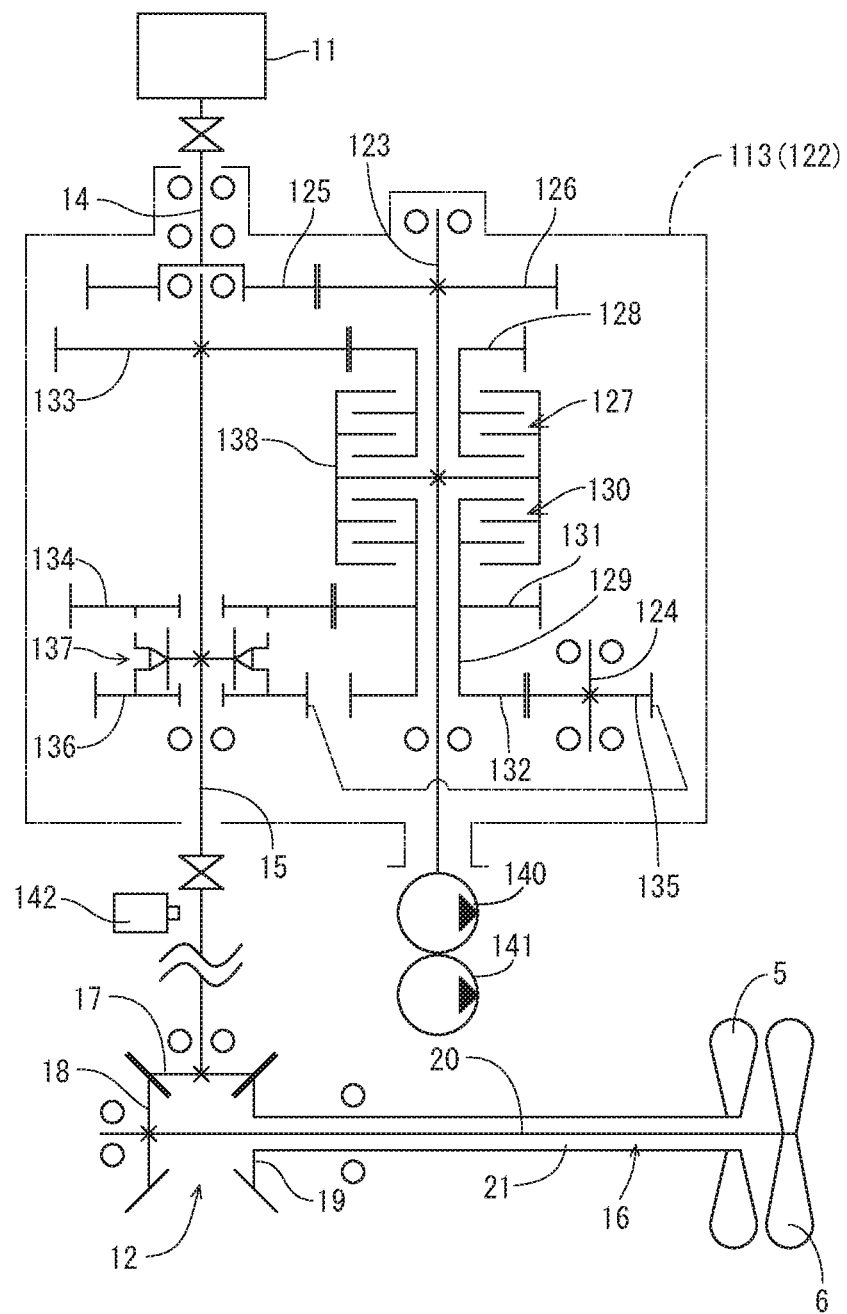
FIG. 7 is a single-line diagram illustrating a power transmission system of an outboard motor according to a second embodiment.
Figure 8:
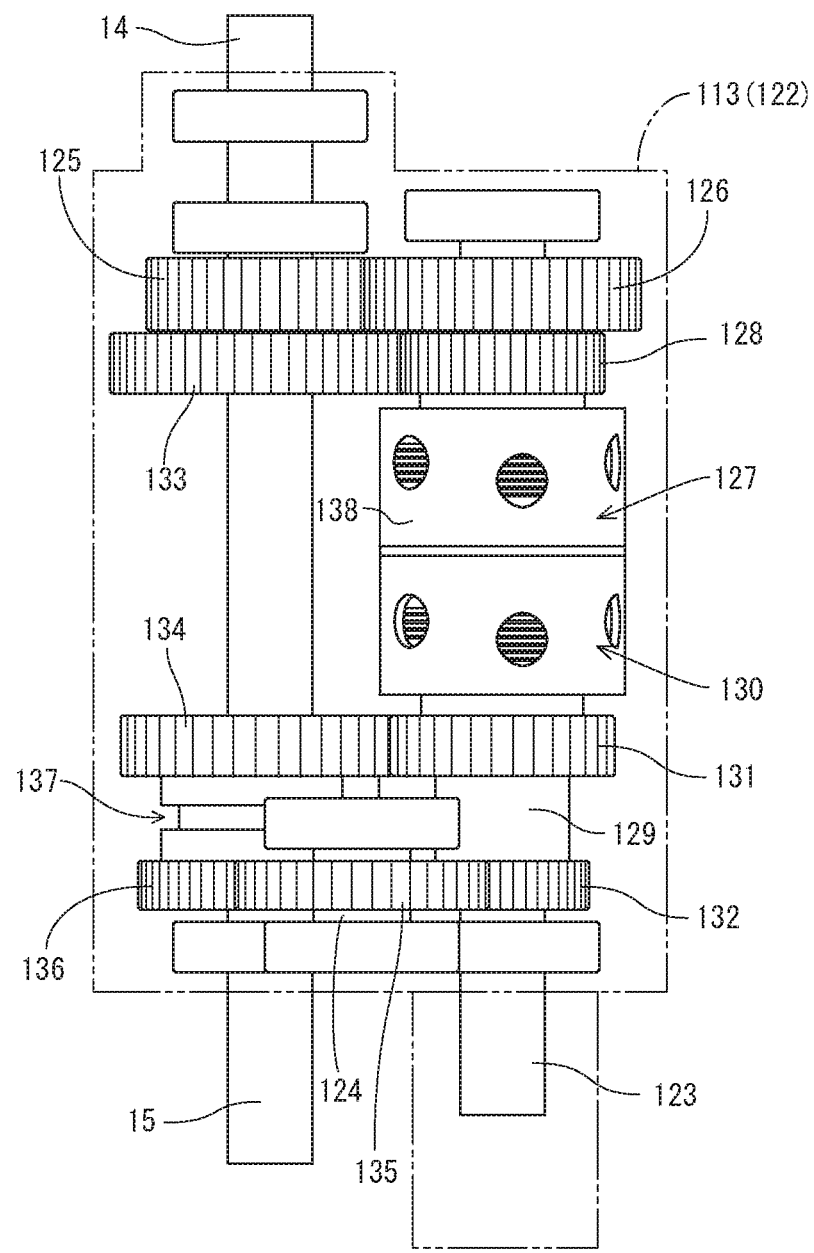
FIG. 8 is a schematic perspective view of the transmission illustrating the internal structure.
Figure 9:
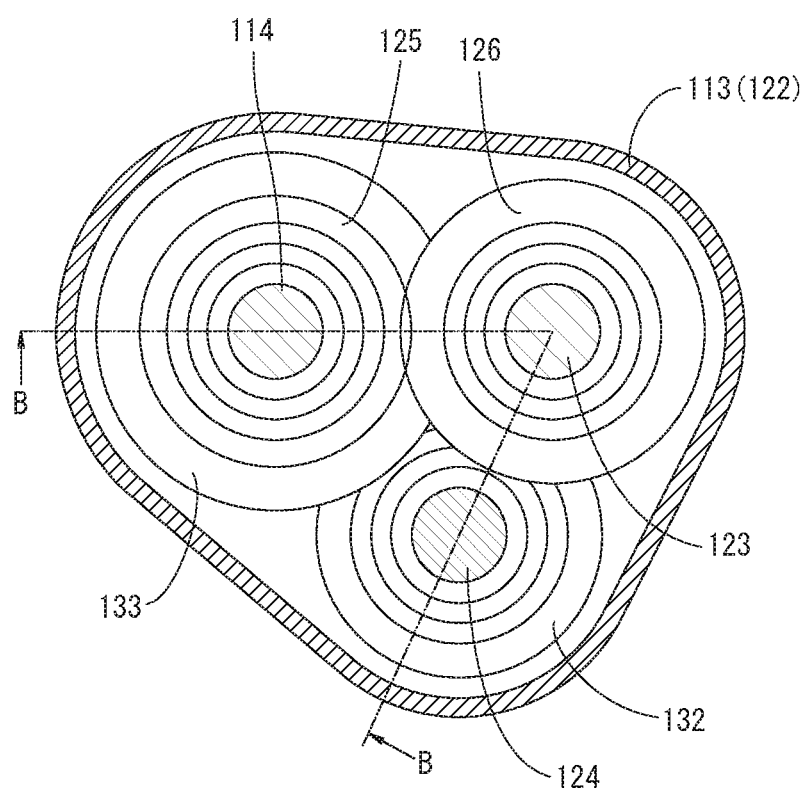
FIG. 9 is a cross-sectional plan view of the transmission illustrating the internal structure.

In the second embodiment, the rotational speed of the output shaft 15 is detected using a rotational speed detection sensor 142 (refer to FIG. 7). The connection and disconnection of the forward low-speed clutch 127, the forward high-speed and reverse clutch 130, and the forward/reverse switching clutch 137 are configured to be automatically controlled depending on the relationship between the rotational speeds of the engine 11 and the output shaft 15. The connection and disconnection of the forward low-speed clutch 127, the forward high-speed and reverse clutch 130, and the forward/reverse switching clutch 137 may be configured to be manually controlled using, for example, a lever.

In the second embodiment, the input shaft 14 and the main relay shaft 123 are configured to be constantly rotated by the rotational power when the engine 11 is driven. The lowest end portion of the main relay shaft 123 projects downward from the lower plate portion of the transmission case 122. The hydraulic pump, which is a clutch pump 140 in this embodiment, is coupled to the projecting end portion. The clutch pump 140 supplies hydraulic oil to the forward low-speed clutch 127, the forward high-speed and reverse clutch 130, and the cylinder 160. The transmission case 122 of the transmission 113 is used also as a hydraulic oil tank, and the hydraulic oil inside the transmission case 122 is supplied to the clutch pump 140. A coolant pump 141 may further be coupled to the lower end section of the reverse relay shaft 124 in tandem with the clutch pump 140 (refer to FIG. 7). The coolant pump 141 circulates coolant for cooling the engine 11.

Thus, the transmission 113 of the second embodiment includes a power take-off function that uses the rotational power of the engine 11 to drive auxiliary devices, that is, auxiliary pumps such as the clutch pump 140 and the coolant pump 141. The transmission 113, the clutch pump 140, and the coolant pump 141 are integrally mounted to form a unit. The auxiliary pumps also include, for example, a steering hydraulic pump for steering the outboard motor and a tilt and trim hydraulic pump for vertically pivoting the outboard motor.

Figure 10:
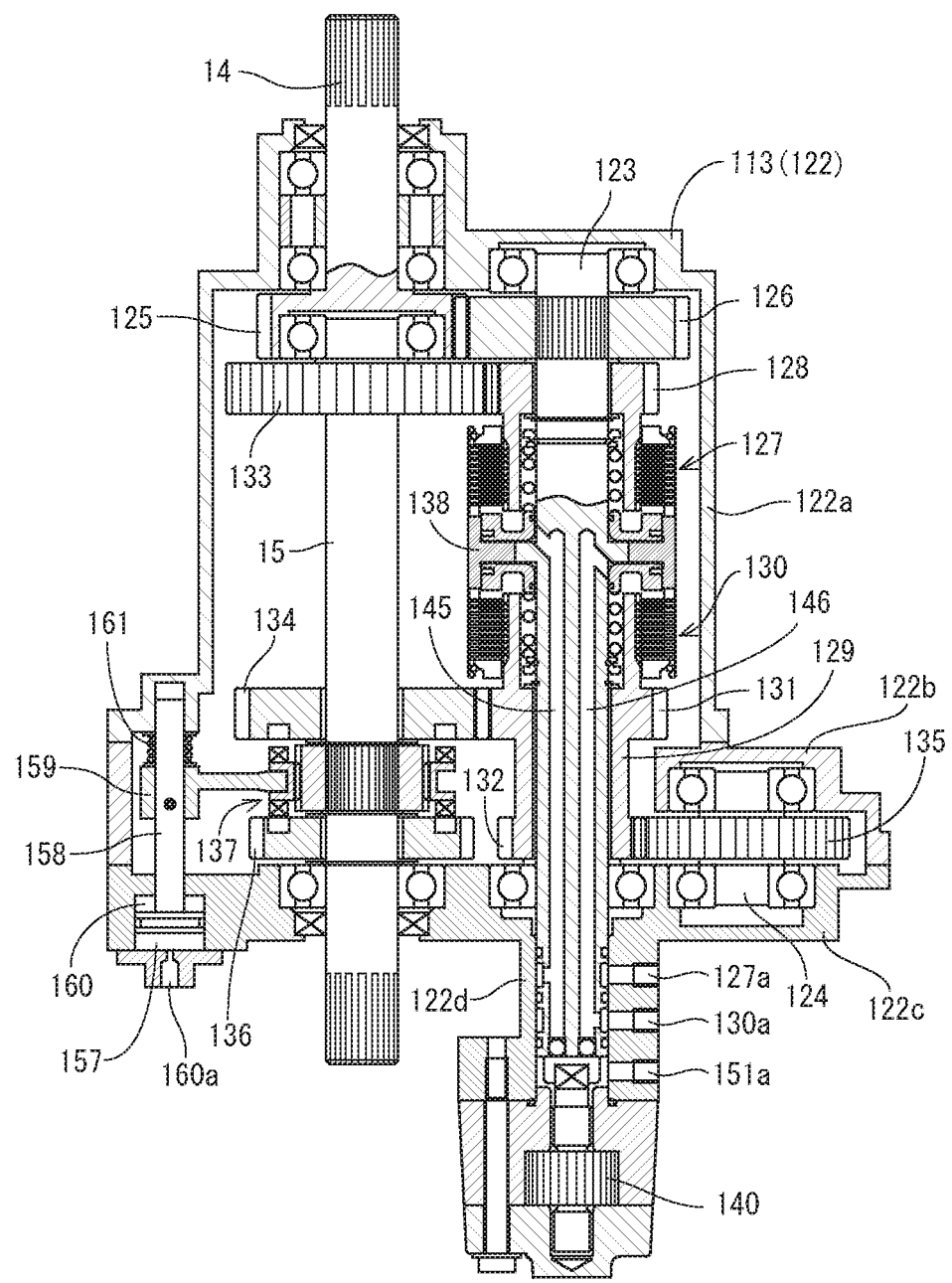
FIG. 10 is a cross-sectional view taken along the line B-B of FIG. 9.
Figure 11:
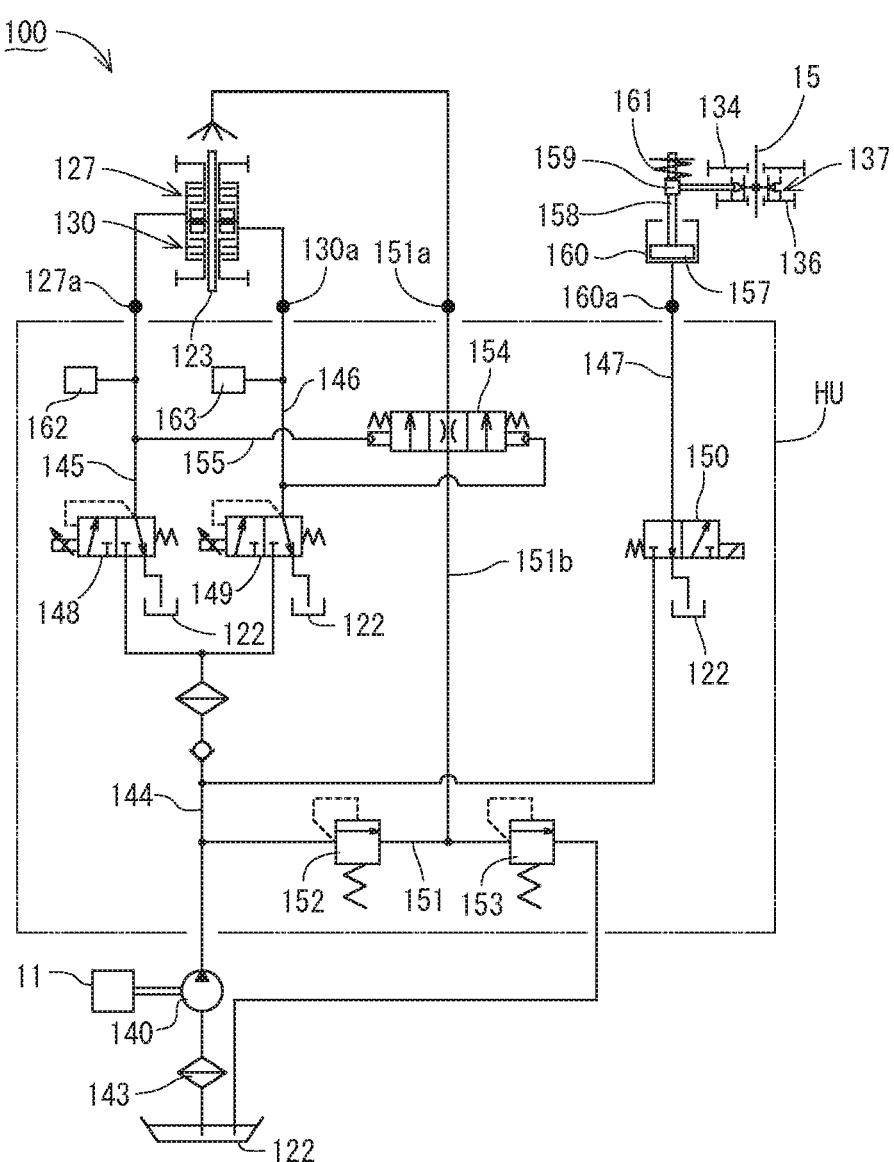
FIG. 11 is a hydraulic circuit diagram of the outboard motor.

Next, the configuration of the hydraulic circuit 100 of the outboard motor 1 (transmission 113) according to the second embodiment will be described with reference to FIGS. 10 and 11. The hydraulic circuit 100 of the outboard motor 1 includes the clutch pump 140, which is driven by the rotational power of the engine 11. As described above, the clutch pump 140 supplies hydraulic oil to the forward low-speed clutch 127, the forward high-speed and reverse clutch 130, and the cylinder 160. The clutch pump 140 is located at the middle portion of a hydraulic oil passage 144. The hydraulic oil passage 144 is coupled to the hydraulic oil tank, which is the transmission case 122 in this embodiment. A strainer 143 is located on the suction side of the clutch pump 140 in the hydraulic oil passage 144.

The hydraulic oil passage 144 on the discharge side of the clutch pump 140 branches into three passages including the forward low-speed oil passage 145, the forward high-speed and reverse oil passage 146, and a piston hydraulic oil passage 147. The forward low-speed oil passage 145 extends toward the forward low-speed clutch 127 via the oil supply port 127*a*. The forward high-speed and reverse oil passage 146 extends toward the forward high-speed and reverse clutch 130 via the oil supply port 130*a*. The piston hydraulic oil passage 147 extends toward the cylinder 160 via an oil supply port 160*a*. A forward low-speed proportional solenoid valve 148 is provided at the middle portion of the forward low-speed oil passage 145. The forward low-speed proportional solenoid valve 148 connects and disconnects the forward low-speed clutch 127. A forward high-speed and reverse proportional solenoid valve 149 is provided at the middle portion of the forward high-speed and reverse oil passage 146. The forward high-speed and reverse proportional solenoid valve 149 connects and disconnects the forward high-speed and reverse clutch 130. A front/reverse switching solenoid valve 150 is provided at the middle portion of the piston hydraulic oil passage 147. The front/reverse switching solenoid valve 150 slides the piston 157 for connecting and disconnecting the forward/reverse switching clutch 137. Depending on the combination of the switching operation of the proportional solenoid valves 148 and 149 and the solenoid valve 150, the hydraulic oil is selectively supplied to both the forward low-speed clutch 127 and the forward high-speed and reverse clutch 130, or either the forward high-speed and reverse clutch 130 or the cylinder 160.

A lubricant passage 151 extends from the middle portion of the hydraulic oil passage 144. The lubricant passage 151 supplies lubricant, which is the hydraulic oil in this embodiment, to the forward low-speed clutch 127 and the forward high-speed and reverse clutch 130. A hydraulic oil pressure regulating valve 152 and a lubricant pressure regulating valve 153 are provided in the lubricant passage 151 in this order from the upstream end. The hydraulic oil pressure regulating valve 152 and the lubricant pressure regulating valve 153 are relief valves for maintaining the hydraulic pressure in the hydraulic oil passage 144. The pressure of the hydraulic oil that has passed through the hydraulic oil pressure regulating valve 152 is reduced by the lubricant pressure regulating valve 153, and the hydraulic oil is supplied to the forward low-speed clutch 127 and the forward high-speed and reverse clutch 130 as the lubricant. Unnecessary hydraulic oil that causes the pressure to be equal to or greater than a predetermined pressure is returned from the lubricant pressure regulating valve 153 to the transmission case 122.

The lubricant passage 151 branches between the hydraulic oil pressure regulating valve 152 and the lubricant pressure regulating valve 153 and forms a lubricant supply passage 151*b*. The lubricant supply passage 151*b* supplies hydraulic oil to the forward low-speed clutch 127 and the forward high-speed and reverse clutch 130. A hydraulic oil flow rate regulating valve 154 is provided at the middle portion of the lubricant supply passage 151*b*. The hydraulic oil flow rate regulating valve 154 adjusts the flow rate of the hydraulic oil supplied to the forward low-speed clutch 127 and the forward high-speed and reverse clutch 130. One end of the hydraulic oil flow rate regulating valve 154 is coupled to a forward low-speed back-pressure oil passage 155. The forward low-speed back-pressure oil passage 155 branches from the forward low-speed oil passage 145 at a position downstream of the forward low-speed proportional solenoid valve 148. Thus, the hydraulic oil flow rate regulating valve 154 receives the forward low-speed back-pressure as a pilot pressure. The other end of the hydraulic oil flow rate regulating valve 154 is coupled to a forward high-speed and reverse back-pressure oil passage 156. The forward high-speed and reverse back-pressure oil passage 156 branches from the forward high-speed and reverse oil passage 146 at a position downstream of the forward high-speed and reverse proportional solenoid valve 149. Thus, the hydraulic oil flow rate regulating valve 154 receives the forward high-speed and reverse back-pressure as the pilot pressure.

A forward low-speed side pressure sensor 162 is provided in the forward low-speed oil passage 145 between the forward low-speed proportional solenoid valve 148 and the forward low-speed clutch 127. The forward low-speed side pressure sensor 162 measures the pressure in the forward low-speed oil passage 145. At the time of coupling the forward low-speed clutch 127, the control current amount to be applied to the forward low-speed proportional solenoid valve 148 is set in accordance with the measured pressure obtained by the forward low-speed side pressure sensor 162. Similarly, a forward high-speed and reverse side pressure sensor 163 is provided in the forward high-speed and reverse oil passage 146 between the forward high-speed and reverse proportional solenoid valve 149 and the forward high-speed and reverse clutch 130. The forward high-speed and reverse side pressure sensor 163 measures the pressure in the forward high-speed and reverse oil passage 146. At the time of coupling the forward high-speed and reverse clutch 130, the control current amount to be applied to the forward high-speed and reverse proportional solenoid valve 149 is set in accordance with the measured pressure obtained by the forward high-speed and reverse side pressure sensor 163.

That is, at the time of coupling the forward low-speed clutch 127, the valve opening degree of the forward low-speed proportional solenoid valve 148 is gradually increased in accordance with the pressure signal from the forward low-speed side pressure sensor 162 so that the set pressure of the hydraulic oil pressure regulating valve 152 is reduced to gradually increase the hydraulic oil pressure to the forward low-speed clutch 127. Similarly, at the time of coupling the forward high-speed and reverse clutch 130, the valve opening degree of the forward high-speed and reverse proportional solenoid valve 149 is gradually increased in accordance with the pressure signal from the forward high-speed and reverse side pressure sensor 163 to gradually increase the hydraulic oil pressure to the forward high-speed and reverse clutch 130. Thus, the forward low-speed clutch 127 or the forward high-speed and reverse clutch 130 is gradually brought into a coupled state (engaged state). As a result, shock generated at the time of coupling the clutches 127 and 130 is reduced.

Figure 12:
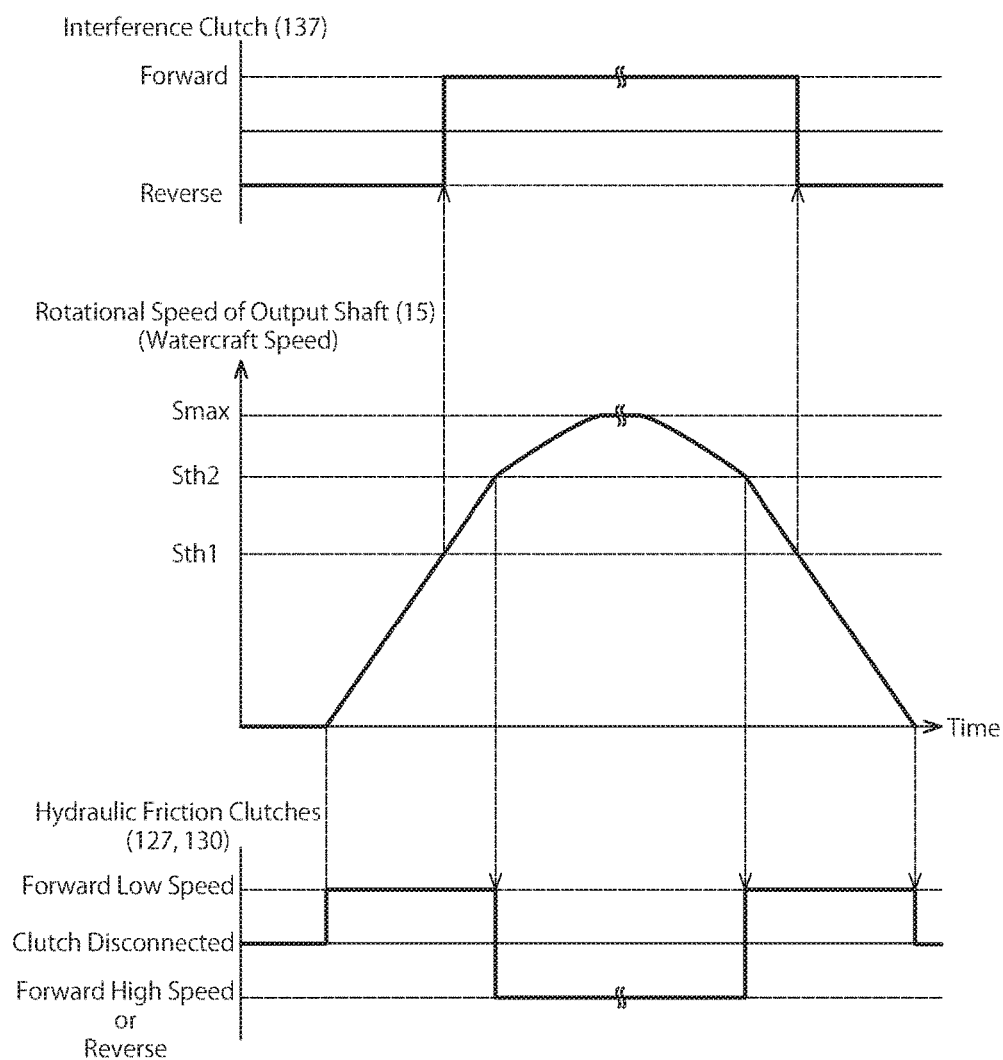
FIG. 12 is a timing diagram illustrating the relationship between the rotational speed of the output shaft and the switching operation of the electromagnetic valves.

The front/reverse switching solenoid valve 150 instantly switches between a state in which the pressurized oil is supplied to the cylinder 160 and a state in which the pressurized oil is discharged from the cylinder 160. In the case in which the forward high-speed and reverse clutch 130 is coupled, the front/reverse switching solenoid valve 150 is capable of instantly switching from the forward high-speed state to the reverse state. At this time, the front/reverse switching solenoid valve 150 causes the lubricant to be discharged from the cylinder 160 and causes the piston 157 to slide by the urging force of the spring 161 to switch the gear coupled to the forward/reverse switching clutch 137 from the forward high-speed output gear 134 to the reverse output gear 136. As will be described below, if the rotational speed of the output shaft 15 measured by the rotational speed detection sensor 142 exceeds a predetermined threshold value Sth1 (refer to FIG. 12) while the forward low-speed clutch 127 is coupled, the front/reverse switching solenoid valve 150 starts supplying oil to the cylinder 160. Accordingly, the piston 157 slides (upward) against the spring 161, and the gear coupled to the forward/reverse switching clutch 137 is switched from the reverse output gear 136 to the forward high-speed output gear 134.

If there is a pressure difference between the forward low-speed back-pressure and the forward high-speed and reverse back-pressure, the hydraulic oil flow rate regulating valve 154 increases the flow rate of lubricant that flows through the lubricant supply passage 151b. If there is no pressure difference between the forward low-speed back-pressure and the forward high-speed and reverse back-pressure, the hydraulic oil flow rate regulating valve 154 reduces the flow rate of lubricant that flows through the lubricant supply passage 151b. Thus, since the pressure difference occurs between the forward low-speed back-pressure and the forward high-speed and reverse back-pressure when the forward low-speed clutch 127 or the forward high-speed and reverse clutch 130 is coupled, the flow rate of lubricant to be supplied to the forward low-speed clutch 127 and the forward high-speed and reverse clutch 130 is increased. When both the forward low-speed clutch 127 and the forward high-speed and reverse clutch 130 are disconnected, the forward low-speed back-pressure and the forward high-speed and reverse back-pressure are approximately the same. Thus, the flow rate of lubricant to be supplied to the forward low-speed clutch 127 and the forward high-speed and reverse clutch 130 is reduced to reduce the drag torque. This reduces the energy loss.

Next, the switching operation of parts of the transmission 113 during acceleration and deceleration of the hull (not shown) on which the outboard motor 1 according to the second embodiment is mounted will be described with reference to FIGS. 7 and 10 to 12. When the transmission 113 is accelerated from the neutral state, a controller (not shown) switches the forward low-speed proportional solenoid valve 148 to a hydraulic oil supply position to couple the forward low-speed clutch 127. This brings the transmission 113 into the forward low-speed state, and the rotational speed of the output shaft 15 is accelerated in accordance with the rotational speed of the engine 11.

Subsequently, if it is determined that the rotational speed of the output shaft 15 has exceeded the first threshold value (front/reverse switching threshold value) Sth1 based on the measurement signal from the rotational speed detection sensor 142, the controller switches the front/reverse switching solenoid valve 150 to the hydraulic oil supply position and activates the piston 157 to couple the forward high-speed output gear 134. If it is determined that the rotational speed of the output shaft 15 has further accelerated and has exceeded a second threshold value (low/high-speed switching threshold value) Sth2 (Sth2>Sth1), the controller switches the forward low-speed proportional solenoid valve 148 to a hydraulic oil discharge position to disconnect the forward low-speed clutch 127 and simultaneously switches the forward high-speed and reverse proportional solenoid valve 149 to the hydraulic oil supply position to couple the forward high-speed and reverse clutch 130. At this time, since the gear coupled to the forward/reverse switching clutch 137 is switched from the reverse output gear 136 to the forward high-speed output gear 134 while the forward high-speed and reverse clutch 130 is disconnected in the forward low-speed state, the transmission 113 is smoothly switched from the forward low-speed state to the forward high-speed state.

In a case in which the transmission 113 is brought into the neutral state by decelerating from the forward high-speed state, if it is determined that the rotational speed of the output shaft 15 has decreased to be less than the second threshold value Sth2, the controller switches the forward low-speed proportional solenoid valve 148 to the hydraulic oil supply position to couple the forward low-speed clutch 127 and simultaneously switches the forward high-speed and reverse proportional solenoid valve 149 to the hydraulic oil discharge position to disconnect the forward high-speed and reverse clutch 130. Subsequently, if it is determined that the rotational speed of the output shaft 15 is further decelerated to be less than the first threshold value Sth1, the controller switches the front/reverse switching solenoid valve 150 to the hydraulic oil discharge position to activate the piston 157 and couples the reverse output gear 136.

As is clear from the above description and FIGS. 7 to 10, according to the outboard motor 1 of the second embodiment, the transmission 113 includes the main relay shaft 123, which relays the power transmitted to the input shaft 14 to the output shaft 15, and the reverse relay shaft 124, which further relays the rotational power of the main relay shaft 123 to the output shaft 15. The forward low-speed gear (forward gear) 128, the reverse gear 132, the forward low-speed clutch (forward clutch) 127, which connects and disconnects power transmission to the forward low-speed gear 128, and the forward high-speed and reverse clutch (reverse clutch) 130, which connects and disconnects power transmission to the reverse gear 132, are located on the main relay shaft 123. The forward low-speed output gear (forward output gear) 133, which engages with the forward low-speed gear 128, the reverse output gear 136, which engages with the reverse gear 132, the forward/reverse switching clutch 137, which connects and disconnects power transmission to the reverse output gear 136, are located on the output shaft 15. Thus, although the transmission 113 includes the mechanism that switches the rotational output of the propellers 5 and 6 between the forward rotation and the reverse rotation, the transmission 113 has a simple structure and reduced size and costs. This contributes to reducing the size of the outboard motor 1.

When the transmission 113 is in the neutral state, in which both the forward low-speed clutch (forward clutch) 127 and the forward high-speed and reverse clutch (reverse clutch) 130 are disconnected, the output shaft 15 is corotated by the rotational power of the engine 11. However, with the configuration of the second embodiment, the forward/reverse switching clutch 137 is coupled to the reverse side (reverse output gear 136). Thus, the rotation direction of the corotation transmitted from the main relay shaft 123 to the output shaft 15 and the rotation direction of the corotation transmitted from the reverse relay shaft 124 to the output shaft 15 are opposite to each other. Consequently, the rotational forces of the corotation cancel each other. Thus, when the transmission 113 is in the neutral state, there is no possibility that the output shaft 15 is accidentally rotated.

The forward high-speed and reverse gear 129 includes the forward high-speed gear 131 and the reverse gear 132, which are coupled to the forward high-speed and reverse gear 129, and is loosely fitted to the main relay shaft 123. The forward high-speed and reverse clutch 130, which connects and disconnects power transmission from the main relay shaft 123 to the forward high-speed and reverse gear 129, is provided. Thus, the forward high-speed gear 131 and the reverse gear 132 share the forward high-speed and reverse gear 129. This configuration omits one gear to be provided on the main relay shaft 123 and further reduces the size of the transmission 113.

In addition, the outboard motor 1 of the second embodiment includes the forward low-speed gear 128, the forward high-speed gear 131, the forward low-speed clutch 127, which connects and disconnects power transmission from the main relay shaft 123 to the forward low-speed gear 128, and the forward high-speed and reverse clutch 130, which connects and disconnects power transmission from the main relay shaft 123 to the forward high-speed gear 131. This configures a two-forward speed transmission and thus allows selecting one of the gears 128 and 131 having a gear ratio that suits the condition as necessary to exert a suitable output and to enable an appropriate traveling.

Figure 13:
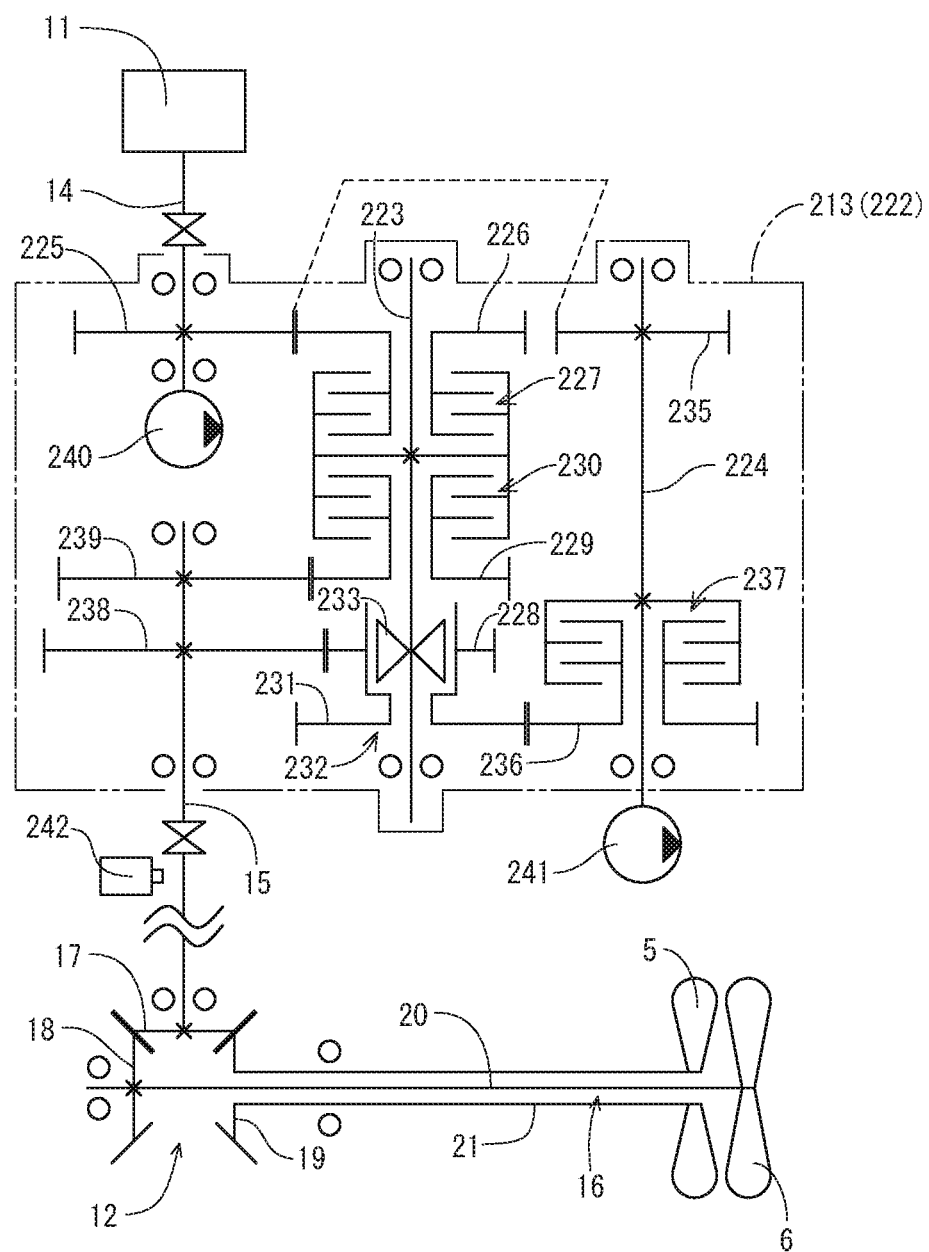
FIG. 13 is a single-line diagram illustrating a power transmission system of an outboard motor according to a third embodiment.
Figure 14:
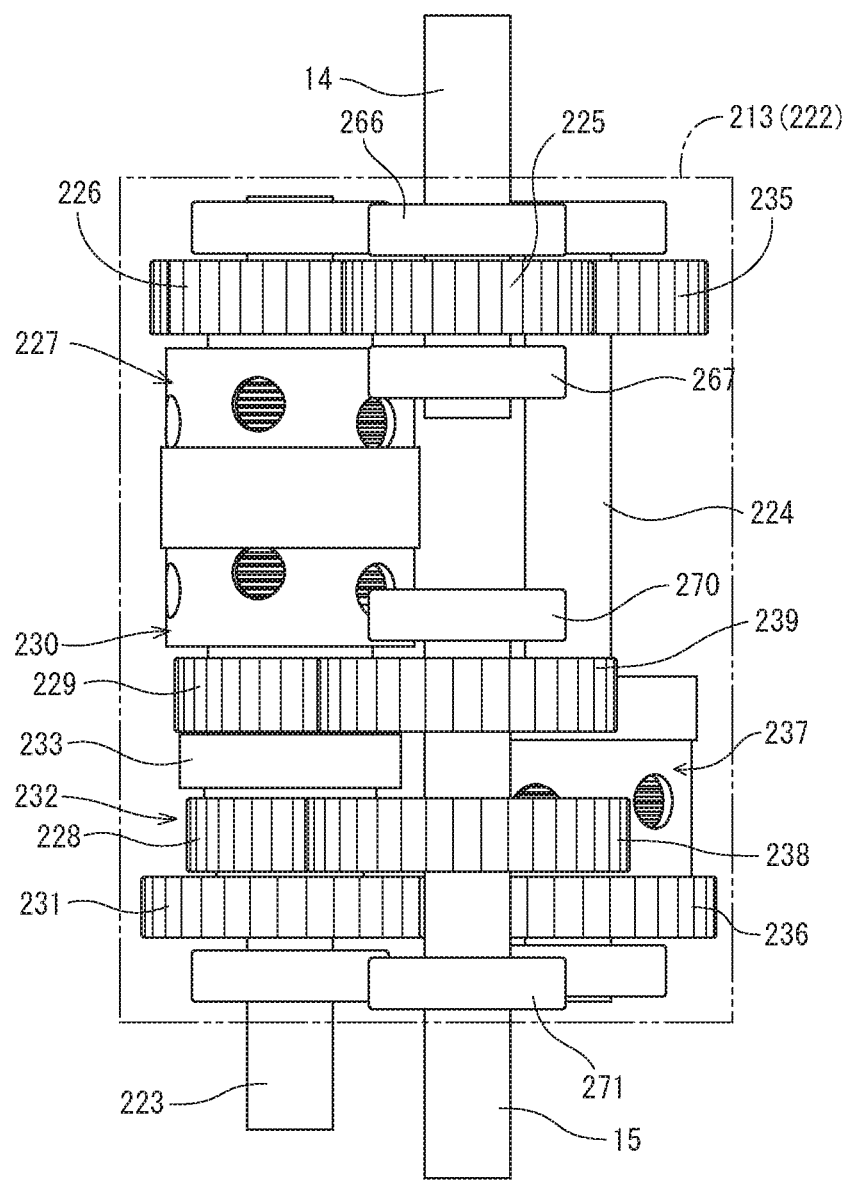
FIG. 14 is a side view of the transmission illustrating the internal structure.

FIGS. 13 to 16 illustrate a transmission 213 of an outboard motor 1 according to a third embodiment. The third embodiment differs from the first and second embodiments in the transmission 213. In FIG. 14, illustration of a clutch pump 240 and a coolant pump 241, which will be discussed below, is omitted. The lower end section of the input shaft 14 is rotationally supported on the upper plate portion of a transmission case 222 constituting the transmission 213. The upper end section of the output shaft 15 is rotationally supported on a lid member 222a. The lid member 222a forms the lower plate portion of the transmission case 222. A forward shaft 223 and a reverse shaft 224 are rotationally supported in the transmission case 222 of the transmission 213. The forward shaft 223 and the reverse shaft 224 extend vertically and are arranged side by side. Thus, the input and output shafts 14 and 15, which are coaxial with each other, the forward shaft 223, and the reverse shaft 224 extend parallel to one another in the vertical direction. Furthermore, the input and output shafts 14 and 15, the forward shaft 223, and the reverse shaft 224 are located at positions that form vertexes of an approximately triangular shape in a cross-sectional plan view (refer to FIG. 15).

A forward input gear 226, a forward high-speed gear 229, and a forward/reverse relay gear 232 are loosely fitted on the forward shaft 223 in this order from the upstream end. The forward input gear 226 is coupled by a forward low-speed clutch 227, which is a hydraulic multi-plate clutch in this embodiment, to be capable of connecting and disconnecting power. The forward high-speed gear 229 is coupled by a forward high-speed clutch 230, which is a hydraulic multi-plate clutch in this embodiment, to be capable of connecting and disconnecting power. The forward/reverse relay gear 232 is formed by coupling a forward low-speed gear 228 and a reverse relay gear 231. The forward input gear 226 is constantly engaged with an input branch gear 225. The input branch gear 225 is fixed to the lower end section of the input shaft 14. The forward low-speed clutch 227 connects and disconnects power transmission from the input shaft 14 to the forward shaft 223. The forward high-speed clutch 230 connects and disconnects power transmission from the forward shaft 223 to the forward high-speed gear 229. The lower ends of the forward shaft 223 and the reverse shaft 224 extend through the lid member 222a and are covered with an oil passage relay member 222b. Oil supply ports 227a, 230a, and 237a are formed in the oil passage relay member 222b and are coupled to a hydraulic circuit 200, which will be discussed below, to be capable of supplying oil to the clutches 227, 230, and 237 through the oil passages in the forward shaft 223 and the reverse shaft 224. The oil that flows through an oil supply port 251a is discharged toward the friction plates of the clutches 227, 230, and 237 on the forward shaft 223 and the reverse shaft 224.

The forward low-speed gear 228, which is a component of the forward/reverse relay gear 232, is constantly engaged with a forward/reverse output gear 238. The forward/reverse output gear 238 is fixed to the upper end section of the output shaft 15. The forward high-speed gear 229 is constantly engaged with a forward high-speed output gear 239. The forward high-speed output gear 239 is also fixed to the upper end section of the output shaft 15. The forward low-speed clutch 227 and the forward high-speed clutch 230 correspond to the forward clutch. The forward low-speed gear 228, which is the component of the forward/reverse relay gear 232, and the forward high-speed gear 229 correspond to the forward gear.

A one-way clutch 233 is located between the forward shaft 223 and the forward/reverse relay gear 232. The one-way clutch 233 transmits the forward output from the forward shaft 223 to the forward/reverse relay gear 232, but does not transmit the forward output in reverse. The one-way clutch 233 of the third embodiment is a sprag clutch.

Figure 18A:
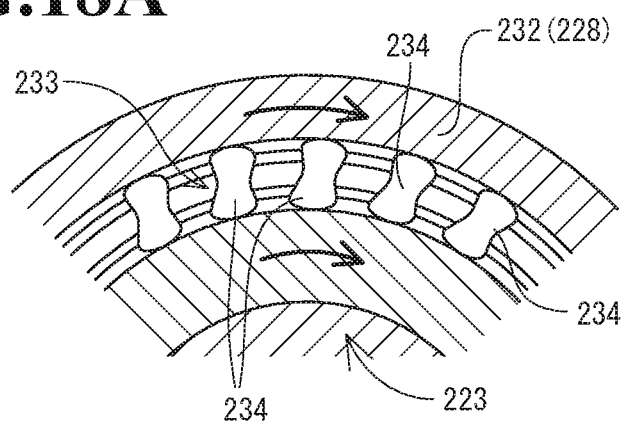
FIG. 18A is a cross-sectional view of a one-way clutch illustrating the manner in which the one-way clutch is operated during forward low-speed traveling.

In this case, when only the forward low-speed clutch 227 is coupled from the neutral state, and the forward shaft 223 is rotated in the forward output direction, sprags 234 between the forward shaft 223 and the forward/reverse relay gear 232 rise since the forward/reverse relay gear 232 is not driven. Thus, a great frictional force is generated between the sprags 234 and the orbital planes of the forward shaft 223 and the forward/reverse relay gear 232. Consequently, the forward/reverse relay gear 232 is rotated integrally with the forward shaft 223 (refer to FIG. 18A). As a result, the forward low-speed output is transmitted from the forward shaft 223 to the forward/reverse output gear 238 via the forward low-speed gear 228.

Figure 18B:
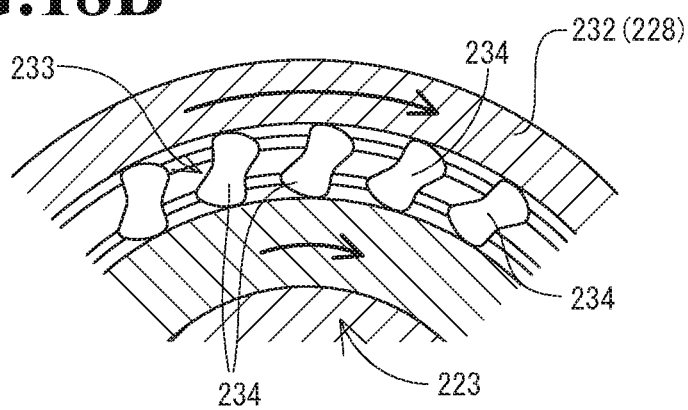
FIG. 18B is a cross-sectional view of the one-way clutch illustrating the manner in which the one-way clutch is operated during forward high-speed traveling.

When both the forward low-speed clutch 227 and the forward high-speed clutch 230 are coupled, due to the gear ratio between the forward high-speed output gear 239 and the forward/reverse output gear 238, power in the same rotation direction is transmitted from the forward/reverse output gear 238 to the forward/reverse relay gear 232 at a speed higher than the speed of the forward shaft 223. Thus, the contact pressure between the sprags 234 and the orbital planes of the forward shaft 223 and the forward/reverse relay gear 232 is reduced to reduce the frictional force, and the forward shaft 223 and the forward/reverse relay gear 232 are freely rotated separately from each other (refer to FIG. 18B).

When the reverse shaft 224 is rotated in the reverse output direction by coupling a reverse clutch 237, which will be discussed below, the reverse output is transmitted from a reverse gear 236 to the reverse relay gear 231. Thus, the sprags 234 between the forward shaft 223 and the forward/reverse relay gear 232 rise so that the forward/reverse relay gear 232 is rotated integrally with the forward shaft 223. However, when the reverse clutch 237 is coupled, the forward low-speed clutch 227 and the forward high-speed clutch 230 are both disconnected. Thus, the forward input gear 226 and the forward high-speed gear 229 are not affected.

A reverse input gear 235 and the reverse gear 236 are located on the reverse shaft 224 in this order from the upstream end. The reverse input gear 235 is constantly engaged with the input branch gear 225. The reverse gear 236 is coupled by the reverse clutch 237, which is a hydraulic multi-plate clutch in this embodiment, to be capable of connecting and disconnecting power. The reverse input gear 235 is fixed to the reverse shaft 224, and the reverse gear 236 is loosely fitted to the reverse shaft 224. The reverse clutch 237 connects and disconnects power transmission from the reverse shaft 224 to the reverse gear 236. The reverse gear 236 is constantly engaged with the reverse relay gear 231, which is a component of the forward/reverse relay gear 232. The forward/reverse relay gear 232 is loosely fitted to the forward shaft 223.

The forward low-speed clutch 227, the forward high-speed clutch 230, and the reverse clutch 237 are hydraulic multi-plate clutches. The input shaft 14 and the output shaft 15 are coupled to be capable of transmitting power by pressing the friction plates of the clutches 227, 230, and 237 together by the hydraulic oil pressure.

That is, when only the forward low-speed clutch 227 is coupled, and the forward high-speed clutch 230 and the reverse clutch 237 are disconnected, the forward input gear 226 is coupled to the forward shaft 223 via the forward low-speed clutch 227 to be unable to rotate relative to each other. Thus, the rotational power of the engine 11 is transmitted from the input branch gear 225 of the input shaft 14 to the forward shaft 223 via the forward input gear 226 and is transmitted from the forward shaft 223 to the forward/reverse output gear 238 via the one-way clutch 233 and the forward/reverse relay gear 232 as the forward low-speed output. As a result, the transmission 213 is brought into the forward low-speed state, in which the rotational power of the engine 11 is transmitted to the output shaft 15 as the forward low-speed output.

When the forward low-speed clutch 227 and the forward high-speed clutch 230 are simultaneously coupled, and the reverse clutch 237 is disconnected, the forward input gear 226 is coupled to the forward shaft 223 via the forward low-speed clutch 227 to be unable to rotate relative to each other, and the forward high-speed gear 229 is also coupled to the forward shaft 223 via the forward high-speed clutch 230 to be unable to rotate relative to each other. Thus, the rotational power of the engine 11 is transmitted from the input branch gear 225 of the input shaft 14 to the forward shaft 223 via the forward input gear 226 and is transmitted from the forward shaft 223 to the forward high-speed output gear 239 via the forward high-speed gear 229 as the forward high-speed output. As a result, the transmission 213 is brought into the forward high-speed state, in which the rotational power of the engine 11 is transmitted to the output shaft 15 as the forward high-speed output.

Furthermore, when the forward low-speed clutch 227 and the forward high-speed clutch 230 are disconnected, and only the reverse clutch 237 is coupled, the reverse gear 236 is coupled to the reverse shaft 224 via the reverse clutch 237 to be unable to rotate relative to each other. Thus, the rotational power of the engine 11 is transmitted from the input branch gear 225 of the input shaft 14 to the reverse shaft 224 via the reverse input gear 235 and is transmitted from the reverse shaft 224 to the forward/reverse output gear 238 via the reverse gear 236 and the forward/reverse relay gear 232 as the reverse output. As a result, the transmission 213 is brought into the reverse state, in which the rotational power of the engine 11 is transmitted to the output shaft 15 as the reverse output.

When all the forward low-speed clutch 227, the forward high-speed clutch 230, and the reverse clutch 237 are disconnected, the transmission 213 is brought into the neutral state, in which the rotational power of the engine 11 is not transmitted to the output shaft 15.

In summary, the rotational power that has been transmitted from the input shaft 14 through the forward shaft 223 is transmitted to the output shaft 15 via the forward/reverse relay gear 232 or the forward high-speed gear 229 as the forward output (the forward low-speed output or the forward high-speed output), and the rotational power transmitted from the input shaft 14 through the reverse shaft 224 is transmitted to the output shaft 15 via the reverse gear 236 and the forward/reverse relay gear 232.

The rotational speed of the output shaft 15 is detected using a rotational speed detection sensor 242 (refer to FIG. 13). Depending on the relationship between the rotational speeds of the engine 11 and the output shaft 15, the connection and disconnection of the forward low-speed clutch 227 and the forward high-speed clutch 230 may be configured to be automatically controlled, or may be configured to be manually controlled with, for example, a lever. The connection and disconnection of the reverse clutch 237 are controlled manually with, for example, a lever.

In the third embodiment, the input shaft 14 and the reverse shaft 224 are configured to be constantly rotated by the rotational power when the engine 11 is driven. Thus, the clutch pump 240, which supplies hydraulic oil to the forward low-speed clutch 227, the forward high-speed clutch 230, and the reverse clutch 237, is coupled to the lowest end portion of the input shaft 14 in the transmission case 222. The clutch pump 240 is a hydraulic pump. In this case, the transmission case 222 of the transmission 213 is also used as a hydraulic oil tank, and the hydraulic oil in the transmission case 222 is supplied to the clutch pump 240. The lower end section of the reverse shaft 224 projects downward from the lower plate portion of the transmission case 222, and the coolant pump 241 is coupled to the projecting end portion. The coolant pump 241 circulates the coolant for cooling the engine 11.

Thus, the transmission 213 of the third embodiment includes a power take-off function that uses the rotational power of the engine 11 to drive auxiliary devices, that is, auxiliary pumps such as the clutch pump 240 and the coolant pump 241. The transmission 213, the clutch pump 240, and the coolant pump 241 are integrally mounted to form a unit.

The auxiliary pumps include, for example, a steering hydraulic pump for steering the outboard motor and a tilt and trim hydraulic pump for vertically pivoting the outboard motor. These auxiliary pumps may be secured to the input shaft 14 in tandem or to the reverse shaft 224 in tandem. The clutch pump 240 and the coolant pump 241 may of course be secured to the reverse shaft 224 in tandem.

Figure 17:
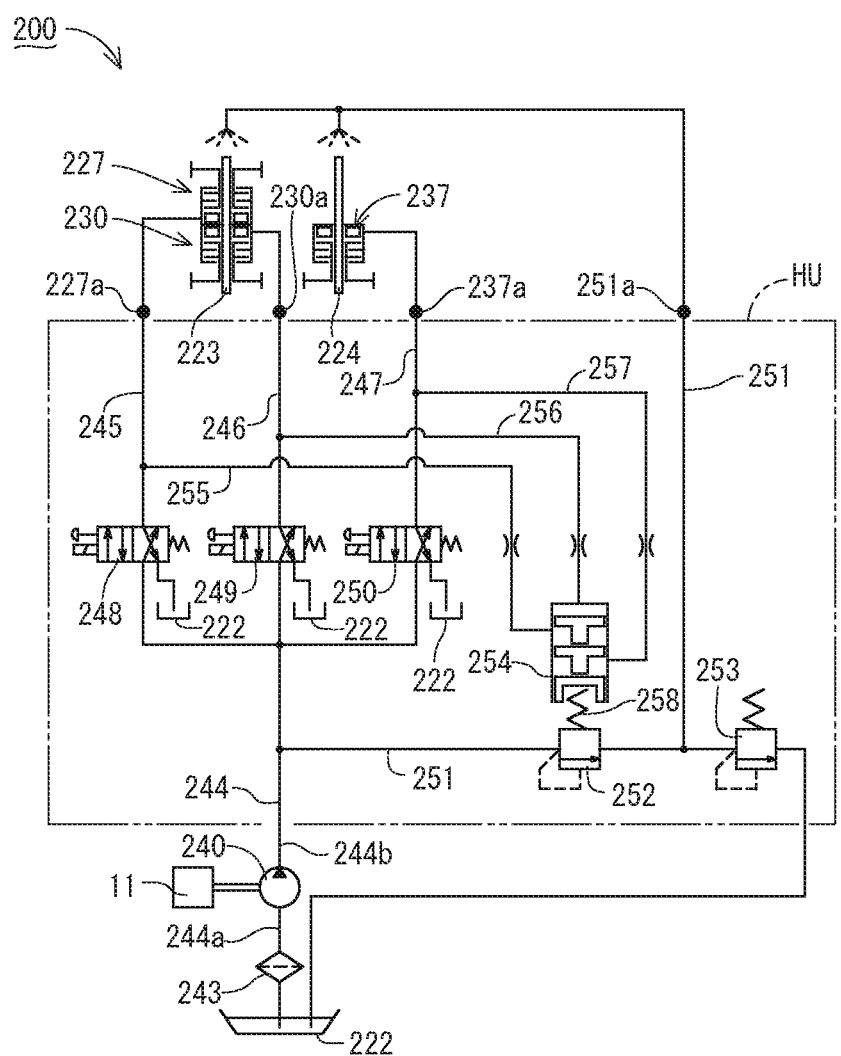
FIG. 17 is a hydraulic circuit diagram of the outboard motor.

Next, the configuration of the hydraulic circuit 200 of the outboard motor 1 (transmission 213) according to the third embodiment will be described with reference to FIG. 17. The hydraulic circuit 200 of the outboard motor 1 includes the clutch pump 240, which is driven by the rotational power of the engine 11. As described above, the clutch pump 240 supplies hydraulic oil to the forward low-speed clutch 227, the forward high-speed clutch 230, and the reverse clutch 237. The clutch pump 240 is located at the middle portion of a hydraulic oil passage 244. The hydraulic oil passage 244 is coupled to the hydraulic oil tank, which is the transmission case 222 in this embodiment. A strainer 243 is located on the suction side of the clutch pump 240 in the hydraulic oil passage 244.

The hydraulic oil passage 244 on the discharge side of the clutch pump 240 branches into three passages including a forward low-speed oil passage 245, a forward high-speed oil passage 246, and a reverse oil passage 247. The forward low-speed oil passage 245 extends toward the forward low-speed clutch 227. The forward high-speed oil passage 246 extends toward the forward high-speed clutch 230. The reverse oil passage 247 extends toward the reverse clutch 237. A forward low-speed solenoid valve 248 is provided at the middle portion of the forward low-speed oil passage 245. The forward low-speed solenoid valve 248 connects and disconnects the forward low-speed clutch 227. A forward high-speed solenoid valve 249 is provided at the middle portion of the forward high-speed oil passage 246. The forward high-speed solenoid valve 249 connects and disconnects the forward high-speed clutch 230. A reverse solenoid valve 250 is provided at the middle portion of the reverse oil passage 247. The reverse solenoid valve 250 connects and disconnects the reverse clutch 237. Depending on the combination of the switching operation of the solenoid valves 248 to 250, hydraulic oil is selectively supplied to the forward low-speed clutch 227, both the forward low-speed clutch 227 and the forward high-speed clutch 230, or the reverse clutch 237.

A lubricant passage 251 extends from the middle portion of the hydraulic oil passage 244. The lubricant passage 251 supplies lubricant, which is the hydraulic oil in this embodiment, to the forward low-speed clutch 227, the forward high-speed clutch 230, and the reverse clutch 237. A hydraulic oil pressure regulating valve 252 and a lubricant pressure regulating valve 253 are provided in the lubricant passage 251 in this order from the upstream end. The hydraulic oil pressure regulating valve 252 is a relief valve for setting the clutch working pressure in the hydraulic oil passage 244. The hydraulic oil that has passed through the hydraulic oil pressure regulating valve 252 is kept at a low pressure by the lubricant pressure regulating valve 253 and is supplied to the forward low-speed clutch 227, the forward high-speed clutch 230, and the reverse clutch 237 as coolant and lubricant for the friction plates. Unnecessary hydraulic oil that causes the pressure to be equal to or greater than a predetermined pressure is returned from the lubricant pressure regulating valve 253 to the transmission case 222.

The hydraulic oil pressure regulating valve 252 includes a slowly fitting valve 254. The slowly fitting valve 254 increments the oil pressure to a predetermined pressure of the hydraulic oil pressure regulating valve 252 in proportion to the time to reduce the shock generated when the clutch is coupled at the time of switching forward or reverse. The slowly fitting valve 254 is coupled to a forward low-speed back-pressure oil passage 255, a forward high-speed back-pressure oil passage 256, and a reverse back-pressure oil passage 257 via respective throttle valves. The forward low-speed back-pressure oil passage 255 branches from the forward low-speed oil passage 245 downstream of the forward low-speed solenoid valve 248. The forward high-speed back-pressure oil passage 256 branches from the forward high-speed oil passage 246 downstream of the forward high-speed solenoid valve 249. The reverse back-pressure oil passage 257 branches from the reverse oil passage 247 downstream of the reverse solenoid valve 250. The slowly fitting valve 254 is configured to gradually increase the hydraulic oil pressure to the forward low-speed clutch 227, the forward high-speed clutch 230, or the reverse clutch 237 by the back-pressure introduced from the back-pressure oil passages 255 to 257 so as to reduce the shock generated when the clutch is coupled at the time of switching forward or reverse.

The hydraulic oil pressure regulating valve 252 opens in accordance with the hydraulic oil pressure in the lubricant passage 251 when all the solenoid valves 248 to 250 are in neutral. When the forward low-speed solenoid valve 248 is drivingly switched to the forward position, when the forward low-speed solenoid valve 248 and the forward high-speed solenoid valve 249 are both drivingly switched to the forward position, or when the reverse solenoid valve 250 is drivingly switched to the reverse position, the hydraulic oil flows into the slowly fitting valve 254 through the corresponding back-pressure oil passages 255 to 257 to close the hydraulic oil pressure regulating valve 252. A relief spring 258 is located between the hydraulic oil pressure regulating valve 252 and the slowly fitting valve 254. With the compression of the relief spring 258, the hydraulic oil pressure regulating valve 252 is operated more slowly than the slowly fitting valve 254 to be gradually brought into a closed state. Thus, the hydraulic oil pressure to the forward low-speed clutch 227, the forward high-speed clutch 230, or the reverse clutch 237 is gradually increased, and the forward low-speed clutch 227, the forward high-speed clutch 230, or the reverse clutch 237 is gradually brought into a coupled state (engaged state). As a result, the shock generated at the time of coupling the clutches 227, 230, and 237 is reduced.

Figure 15:
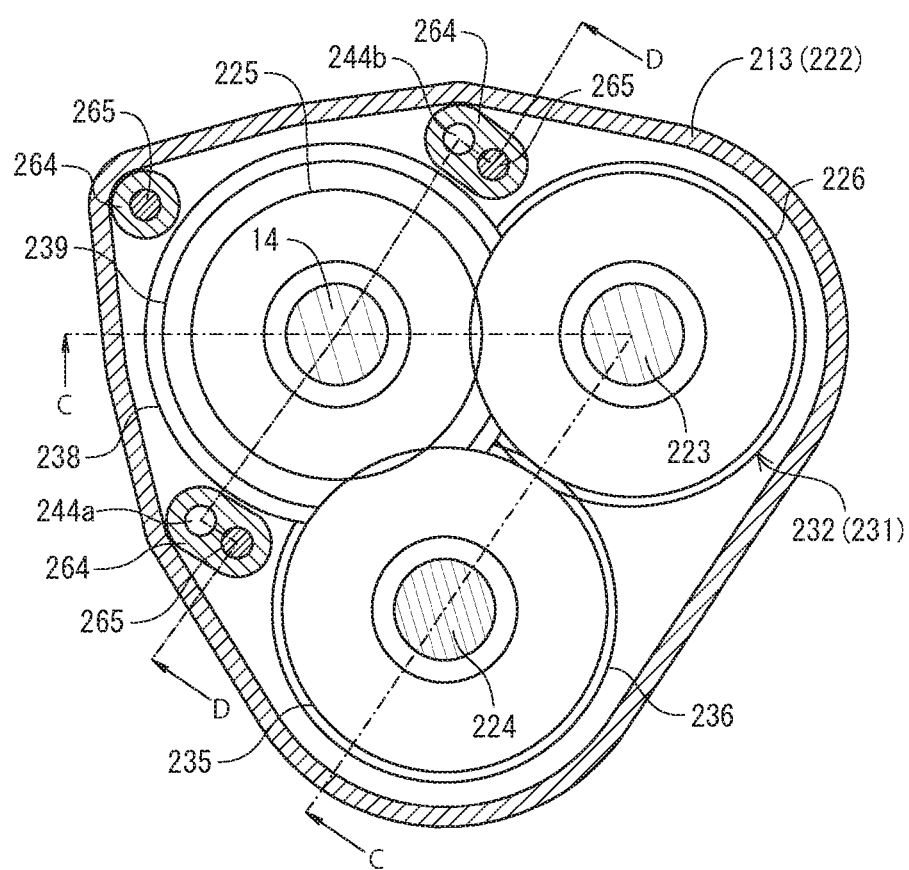
FIG. 15 is a cross-sectional plan view of the transmission illustrating the internal structure.
Figure 16:
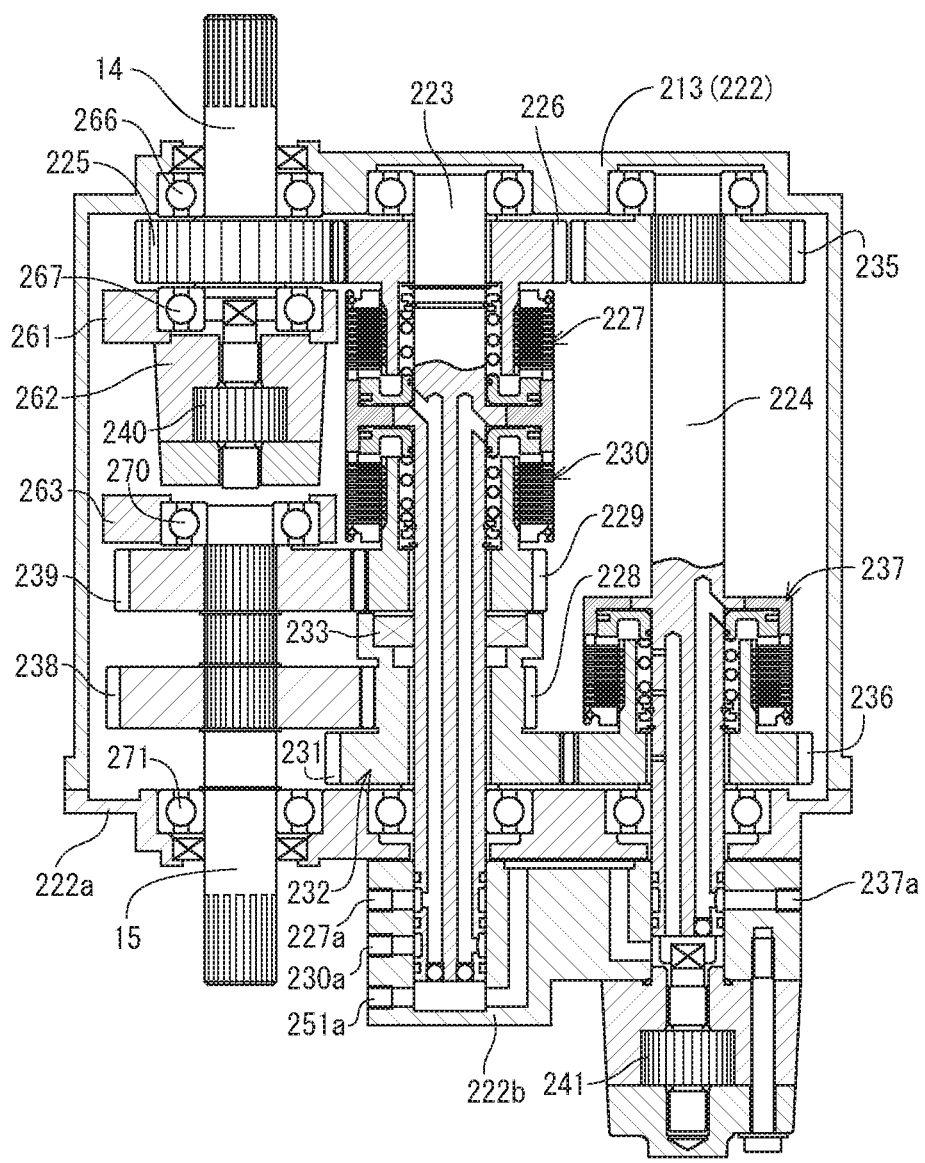
FIG. 16 is a cross-sectional view taken along the line C-C of FIG. 15.
Figure 19:
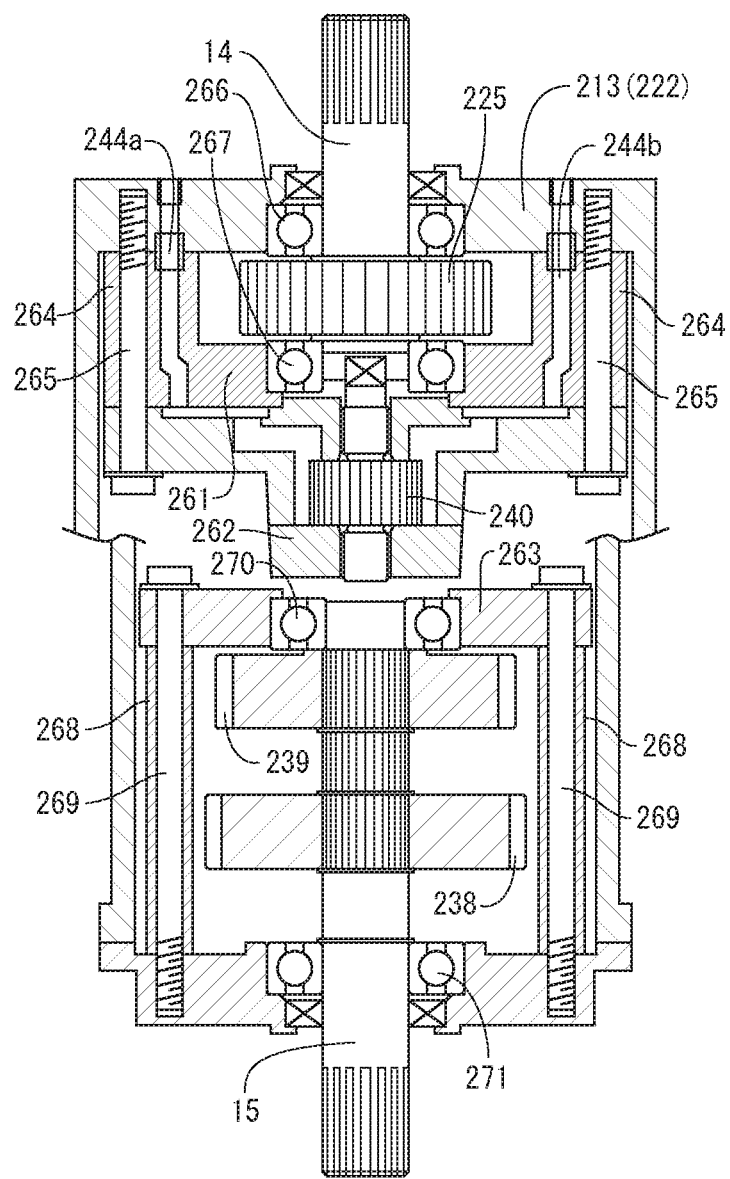
FIG. 19 is a cross-sectional view taken along the line D-D of FIG. 15.

Next, the shaft support structure of the input and output shafts 14 and 15 in the transmission case 222 of the third embodiment will be described with reference to FIGS. 15, 16, and 19. The transmission case 222 accommodates a first bearing holder 261, a pump case 262, and a second bearing holder 263. The first bearing holder 261 supports the lower end section of the input shaft 14. The pump case 262 accommodates the clutch pump 240, which is coupled to the lowest end portion of the input shaft 14. The second bearing holder 263 supports the upper end section of the output shaft 15. The first bearing holder 261 includes a plurality of holder bosses 264. The holder bosses 264 project upward. The holder bosses 264 of the first bearing holder 261 are fastened to the inner surface of the upper plate portion of the transmission case 222 with bolts 265 together with the pump case 262, which is stacked below the first bearing holder 261.

The input shaft 14 is rotationally supported by a pair of upper and lower bearings 266 and 267. The upper bearing 266 is secured to the upper plate portion of the transmission case 222. The lower bearing 267 is secured to the first bearing holder 261. An input branch gear 225 is located on the input shaft 14 between the upper and lower bearings 266 and 267.

In the third embodiment, part of the hydraulic oil passage 244 (244a and 244b), which communicates with the clutch pump 240 in the pump case 262, is formed in two of the holder bosses 264 of the first bearing holder 261. The hydraulic oil passage 244 (244a and 244b) opens in the case outer surface. An oil passage portion 244a is formed in one of the holder bosses 264. The oil passage portion 244a communicates with the hydraulic oil passage 244 on the suction side of the clutch pump 240. An oil passage portion 244b is formed in a different one of the holder bosses 264. The oil passage portion 244b communicates with the hydraulic oil passage 244 on the discharge side of the clutch pump 240. The open end of the oil passage portion 244b, which communicates with the discharge side of the clutch pump 240, is coupled to the hydraulic oil passage 244 of the hydraulic unit HU located above the clutch pump 240 via a pipe.

The second bearing holder 263, which supports the upper end section of the output shaft 15, includes a plurality of holder bosses 268. The holder bosses 268 project downward. The holder bosses 268 of the second bearing holder 263 are fastened to the inner surface of the lower plate portion of the transmission case 222 with bolts 269. The output shaft 15 is rotationally supported by a pair of upper and lower bearings 270 and 271. The upper bearing 270 is secured to the second bearing holder 263. The lower bearing 271 is secured to the lower plate portion of the transmission case 222. The forward high-speed output gear 239 and the forward/reverse output gear 238 are located on the output shaft 15 between the upper and lower bearings 270 and 271.

As is clear from the above description and FIGS. 13 to 16, according to the outboard motor 1 of the third embodiment, the rotational power that has been transmitted from the input shaft 14 through the forward shaft 223 is transmitted to the output shaft 15 via the forward/reverse relay gear 232 or the forward high-speed gear 229 as the forward output (the forward low-speed or the forward high-speed output), and the rotational power that has been transmitted from the input shaft 14 through the reverse shaft 224 is transmitted to the output shaft 15 via the reverse gear 236 and the forward/reverse relay gear 232 as the reverse output. Thus, although the transmission 213 includes a mechanism for switching the rotational output of the front and rear propellers 5 and 6 between the forward rotation and the reverse rotation, the transmission 213 has a simple structure and reduced size and costs. This contributes to reducing the size of the outboard motor 1.

Furthermore, when all the clutches 227, 230, and 237 are in the neutral state, the rotation of the gear 226, which is constantly driven by the gear 225, is affected by the drag torque generated in the clutches 227 and 230 and is transmitted to the gear 239 via the gear 229. Thus, the gear 239 acts to be corotated in the forward direction. The rotation of the gear 235, which is constantly driven by the gear 225, is affected by the drag torque generated in the clutch 237 and is transmitted from the gears 236, 231, and 228 to the gear 238. Thus, the gear 238 acts to be corotated in the reverse direction. Thus, the rotational forces of the corotation in different rotation directions from each other are cancelled on the output shaft 15. Thus, when all the clutches 227, 230, and 237 are in the neutral state, there is no possibility that the output shaft 15 is accidentally rotated by the generation of the drag torque.

The forward low-speed gear 228 and the reverse relay gear 231 are coupled to form the forward/reverse relay gear 232, and the one-way clutch 233 is located between the forward shaft 223 and the forward/reverse relay gear 232. The one-way clutch 233 transmits the forward output from the forward shaft 223 to the forward/reverse relay gear 232, but does not transmit the forward output in reverse. Thus, the forward low-speed gear 228 and the reverse relay gear 231 share the forward/reverse relay gear 232. This configuration omits one gear to be provided on the output shaft 15 and further reduces the size of the transmission 213.

In addition, the outboard motor 1 of the third embodiment includes the forward low-speed gear 228, the forward high-speed gear 229, the forward low-speed clutch 227, which connects and disconnects power transmission from the input shaft 14 to the forward shaft 223, and the forward high-speed clutch 230, which connects and disconnects power transmission from the forward shaft 223 to the forward high-speed gear 229. This configures a two-forward speed transmission and thus allows selecting one of the gears 228 and 229 having a gear ratio that suits the condition as necessary to exert a suitable output and to enable an appropriate traveling.

Obviously, numerous modifications and variations of the present invention are possible in light of the above teachings. It is therefore to be understood that within the scope of the appended claims, the present invention may be practiced otherwise than as specifically described herein.

What is claimed is:

1. An outboard motor comprising:
   an engine comprising an output portion extending along an approximately vertical axis;
   a lower gear mechanism configured to drive a propeller disposed below the engine; and
   a transmission between the engine and the lower gear mechanism, the transmission comprising:
      an input shaft configured to transmit power from the output portion of the engine to the transmission;
      an output shaft configured to transmit power from the transmission to the lower gear mechanism, the input shaft and the output shaft extending along an approximately vertical axis;
      an intermediate shaft;
      a reverse idler shaft disposed parallel to the intermediate shaft along an approximately vertical axis;
      a forward clutch disposed on at least one of the input shaft and the intermediate shaft and configured to connect and disconnect power from the input shaft to the intermediate shaft; and
      a reverse clutch disposed on the intermediate shaft and configured to connect and disconnect power transmission from the input shaft to the intermediate shaft via the reverse idler shaft,
      wherein power of the input shaft is transmitted to the output shaft via the forward clutch and the intermediate shaft as a forward output and is transmitted to the output shaft via the reverse idler shaft, the reverse clutch, and the intermediate shaft as a reverse output.

2. The outboard motor according to claim 1, further comprising a forward gear group comprising:
   a first forward drive gear on the input shaft;
   a second forward drive gear on the input shaft;
   a first forward driven gear disposed on the intermediate shaft and engaged with the first forward drive gear; and
   a second forward driven gear disposed on the intermediate shaft and engaged with the second forward drive gear,
   wherein the forward gear group configured to transmit power from the input shaft to the intermediate shaft, and
   wherein the forward clutch comprises
   a first forward clutch configured to connect and disconnect power transmission between the intermediate shaft and the first forward driven gear, and
   a second forward clutch configured to connect and disconnect power transmission between the input shaft and the second forward drive gear.

3. The outboard motor according to claim 1, further comprising:
   an output gear group comprising output gears and configured to transmit power from the intermediate shaft to the output shaft; and
   an input shaft retaining bearing disposed inward of one of the output gears that is disposed on the output shaft, the input shaft retaining bearing configured to support one end of the input shaft to be freely rotational.

4. The outboard motor according to claim 1, further comprising a corotation prevention device coupled to the intermediate shaft.

5. The outboard motor according to claim 1, wherein the propeller comprises a contra-rotating propeller comprising a front propeller and a rear propeller that are disposed in series and are configured to be drivingly rotated in opposite directions from each other.

6. An outboard motor comprising:
an engine comprising an output portion;
a lower gear mechanism configured to drive a propeller disposed below the engine; and
a transmission between the engine and the lower gear mechanism, the transmission comprising:
an input shaft configured to transmit power from the output portion of the engine to the transmission;
an output shaft configured to transmit power from the transmission to the lower gear mechanism;
a main relay shaft configured to relay the power transmitted to the input shaft to the output shaft;
a reverse relay shaft configured to further relay rotational power of the main relay shaft to the output shaft;
a forward gear disposed on the main relay shaft;
a reverse gear disposed on the main relay shaft;
a forward clutch disposed on the main relay shaft and configured to connect and disconnect power transmission to the forward gear;
a reverse clutch disposed on the main relay shaft and configured to connect and disconnect power transmission to the reverse gear;
a forward output gear disposed on the output shaft and engaged with the forward gear;
a reverse output gear disposed on the output shaft and engaged with the reverse gear; and
a forward/reverse switching clutch disposed on the output shaft and configured to connect and disconnect power transmission to the reverse output gear,
wherein, during forward traveling, the forward clutch is coupled, and the reverse clutch is disconnected, and during reverse traveling, the reverse clutch and the forward/reverse switching clutch are both coupled, and the forward clutch is disconnected.

7. The outboard motor according to claim 6, wherein, in a neutral state, the forward clutch and the reverse clutch are both disconnected, and the forward/reverse switching clutch is coupled.

8. The outboard motor according to claim 6, wherein the forward clutch and the reverse clutch both comprise a hydraulic clutch, and the forward/reverse switching clutch comprises an interference clutch.

9. The outboard motor according to claim 6,
wherein the forward gear comprises a forward low-speed gear loosely fitted to the main relay shaft, and the forward output gear comprises a forward low-speed output gear fixed to the output shaft,
wherein the reverse gear and a forward high-speed gear are coupled to form a forward high-speed and reverse gear loosely fitted to the main relay shaft,
wherein the forward clutch comprises a forward low-speed clutch configured to connect and disconnect power transmission from the main relay shaft to the forward low-speed gear,
wherein the reverse clutch comprises a forward high-speed and reverse clutch configured to connect and disconnect power transmission from the main relay shaft to the forward high-speed and reverse gear,
wherein the forward/reverse switching clutch is configured to select one of the forward high-speed output gear and the reverse output gear that are loosely fitted to the output shaft to couple either the forward high-speed output gear or the reverse output gear to the output shaft,
wherein, during forward low-speed traveling, the forward low-speed clutch is coupled, and the forward/reverse switching clutch is disconnected,
wherein, during forward high-speed traveling, the forward low-speed clutch is disconnected, the forward/reverse switching clutch is coupled, and the forward/reverse switching clutch couples the forward high-speed output gear to the output shaft, and
wherein, during reverse traveling, the forward low-speed clutch is disconnected, the forward/reverse switching clutch is coupled, and the forward/reverse switching clutch couples the reverse output gear to the output shaft.

10. The outboard motor according to claim 6, wherein the propeller comprises a contra-rotating propeller comprising a front propeller and a rear propeller that are disposed in series and are configured to be drivingly rotated in opposite directions from each other.

11. The outboard motor according to claim 6, wherein the output portion of the engine and the input shaft, the output shaft, and the relay shaft of the transmission extend along an approximately vertical axis.

12. An outboard motor comprising:
an engine comprising an output portion;
a lower gear mechanism configured to drive a propeller disposed below the engine; and
a transmission between the engine and the lower gear mechanism, the transmission comprising:
an input shaft configured to transmit power from the output portion of the engine to the transmission;
an output shaft configured to transmit power from the transmission to the lower gear mechanism;
a forward shaft;
a reverse shaft disposed parallel to the forward shaft along an approximately vertical axis;
a forward gear disposed on the forward shaft;
a forward clutch disposed on the forward shaft and configured to connect and disconnect power transmission to the forward gear;
a reverse relay gear disposed on the forward shaft;
a reverse gear disposed on the reverse shaft; and
a reverse clutch disposed on the reverse shaft and configured to connect and disconnect power transmission to the reverse gear,
wherein the power transmitted from the input shaft via the forward shaft is transmitted to the output shaft via the forward gear as a forward output, and the power transmitted from the input shaft via the reverse shaft is transmitted to the output shaft via the reverse gear and the reverse relay gear as a reverse output.

13. The outboard motor according to claim 12,
wherein the forward gear and the reverse relay gear are coupled to form a forward/reverse relay gear, and
wherein a one-way clutch is disposed between the forward shaft and the forward/reverse relay gear, the one-way clutch transmits forward output from the forward shaft to the forward/reverse relay gear, but does not transmit the forward output in reverse.

14. The outboard motor according to claim 13,
wherein the forward gear comprises a forward low-speed gear and a forward high-speed gear,
wherein the forward clutch comprises a forward low-speed clutch configured to connect and disconnect power transmission from the input shaft to the forward shaft and a forward high-speed clutch configured to connect and disconnect power transmission from the forward shaft to the forward high-speed gear, and the forward low-speed clutch and the forward high-speed clutch each comprise a hydraulic multi-plate clutch, and wherein the forward low-speed gear and the reverse relay gear are coupled to form the forward/reverse relay gear.

15. The outboard motor according to claim 14, wherein one of the input shaft and the reverse shaft is coupled to a hydraulic source of the forward clutch, and the hydraulic source comprises a hydraulic pump.

16. The outboard motor according to claim 12, wherein the propeller comprises a contra-rotating propeller comprising a front propeller and a rear propeller that are disposed in series and are configured to be drivingly rotated in opposite directions from each other.

\* \* \* \* \*